US012659546B2

(12) United States Patent　　　　(10) Patent No.:　US 12,659,546 B2
Sipolins et al.　　　　　　　　　　　(45) Date of Patent:　　　Jun. 16, 2026

(54) SYSTEMS AND METHODS FOR SYNCHRONIZING PLAYING OF CONTENT WITH FUTURE EVENTS

(71) Applicant: Adeia Guides Inc., San Jose, CA (US)

(72) Inventors: Aldis Sipolins, Somerville, MA (US); Charles Dasher, Lawrenceville, GA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/967,924

(22) Filed: Dec. 4, 2024

(65) Prior Publication Data

US 2026/0156324 A1　　Jun. 4, 2026

(51) Int. Cl.
*H04N 21/458*　　　(2011.01)
*G06F 16/438*　　　(2019.01)
*H04N 21/262*　　　(2011.01)

(52) U.S. Cl.
CPC ....... *H04N 21/458* (2013.01); *G06F 16/4387* (2019.01); *H04N 21/26208* (2013.01); *H04N 21/26233* (2013.01); *H04N 21/26241* (2013.01); *H04N 21/2625* (2013.01); *H04N 21/26258* (2013.01)

(58) Field of Classification Search
CPC ........... H04N 21/458; H04N 21/26208; H04N 21/26233; H04N 21/26241; H04N 21/2625; H04N 21/26258; G06F 16/4387
See application file for complete search history.

(56) References Cited

U.S. PATENT DOCUMENTS

| | | | |
|---|---|---|---|
| 8,892,551 B2 | 11/2014 | Oikonomou | |
| 10,203,216 B2 * | 2/2019 | Kennedy | G06F 16/487 |
| 10,791,376 B2 * | 9/2020 | Garmark | H04N 21/2387 |
| 10,949,457 B2 * | 3/2021 | DeLuca | H04W 4/70 |
| 10,998,002 B2 * | 5/2021 | Bohn | G11B 20/10527 |
| 11,290,782 B2 * | 3/2022 | Sen | H04N 21/42203 |
| 11,359,923 B2 * | 6/2022 | Davidsson | G01C 21/3697 |
| 11,388,488 B2 * | 7/2022 | Panchaksharaiah | G06F 16/447 |
| 11,402,231 B2 * | 8/2022 | Mahajan | G06F 16/64 |

(Continued)

OTHER PUBLICATIONS

Baumgartner, T., et al., "Extracting spatial knowledge from track and field broadcasts for monocular 3D human pose estimation," Nature Scientific Reports, vol. 13, No. 1, Article No. 14031, Aug. 28, 2023, 12 pages.

(Continued)

*Primary Examiner* — John R Schnurr
(74) *Attorney, Agent, or Firm* — HG LAW LLP

(57)　　　　　　ABSTRACT

The present disclosure is related to systems and methods for synchronizing content items with future events, for example, by dynamically modifying content item playlists. The systems and methods may identify a playlist and a future time at which a time-sensitive content item is to be played. The systems and methods may determine an estimated time of playback of the time-sensitive content item in the playlist and may modify, based on detecting a difference between the estimated time of playback and the identified future time, the playlist to achieve playback of the time-sensitive content item at the identified future time. The systems and methods may modify the playlist by modifying one or more durations of the content items in the playlist based on a plurality of modifiability scores.

20 Claims, 13 Drawing Sheets

(56)  References Cited

U.S. PATENT DOCUMENTS

| | | | | |
|---|---|---|---|---|
| 2010/0023544 | A1* | 1/2010 | Shahraray | G11B 27/105 |
| | | | | 707/E17.009 |
| 2013/0253833 | A1* | 9/2013 | Tuukkanen | G06F 3/0481 |
| | | | | 701/538 |
| 2014/0005814 | A1* | 1/2014 | Hwang | H04N 5/783 |
| | | | | 700/94 |
| 2014/0188920 | A1* | 7/2014 | Sharma | G06F 16/635 |
| | | | | 707/758 |
| 2014/0281971 | A1* | 9/2014 | Isbell, III | H04N 21/458 |
| | | | | 715/716 |
| 2014/0281976 | A1* | 9/2014 | Chia | G06F 16/954 |
| | | | | 715/716 |
| 2014/0298169 | A1* | 10/2014 | Williams | G06Q 50/10 |
| | | | | 715/716 |
| 2015/0088423 | A1* | 3/2015 | Tuukkanen | G01C 21/26 |
| | | | | 701/538 |
| 2016/0246792 | A1* | 8/2016 | Anguiano | G06F 16/9537 |
| 2017/0034663 | A1* | 2/2017 | Nissen | G06F 16/24578 |
| 2017/0115953 | A1* | 4/2017 | Alders | G06N 5/04 |
| 2018/0109920 | A1* | 4/2018 | Aggarwal | G06F 16/9535 |
| 2018/0188054 | A1* | 7/2018 | Kennedy | G08G 1/09675 |
| 2018/0350403 | A1* | 12/2018 | Bohn | H04N 21/44 |
| 2019/0107993 | A1* | 4/2019 | Shibuya | G10L 13/08 |
| 2019/0143995 | A1* | 5/2019 | Aizawa | H04N 21/4524 |
| | | | | 340/576 |
| 2019/0166412 | A1* | 5/2019 | Panchaksharaiah | |
| | | | | H04N 21/26258 |
| 2020/0011678 | A1 | 1/2020 | Patel et al. | |
| 2020/0359062 | A1* | 11/2020 | Pantos | H04N 21/47217 |
| 2020/0382911 | A1* | 12/2020 | Nissen | H04N 21/26241 |
| 2021/0096809 | A1* | 4/2021 | Woo | G05B 15/02 |
| 2021/0365162 | A1* | 11/2021 | Jenkins | H04N 21/41265 |
| 2022/0074756 | A1* | 3/2022 | Gewickey | G01C 21/3697 |
| 2022/0381580 | A1* | 12/2022 | Shah | G06F 16/29 |
| 2023/0421841 | A1 | 12/2023 | Doken et al. | |
| 2025/0314498 | A1* | 10/2025 | Bhatia | H04N 21/4826 |

OTHER PUBLICATIONS

Borighi, G., et al., "Face-from-Depth for Head Pose Estimation on Depth Images," in IEEE Transactions on Pattern Analysis and Machine Intelligence, vol. 42, No. 3, Mar. 1, 2020, pp. 596-609.
Braunhofer, M., et al., "Location-aware music recommendation," International Journal of Multimedia Information Retrieval, vol. 2, Jan. 3, 2013, pp. 31-44.

* cited by examiner

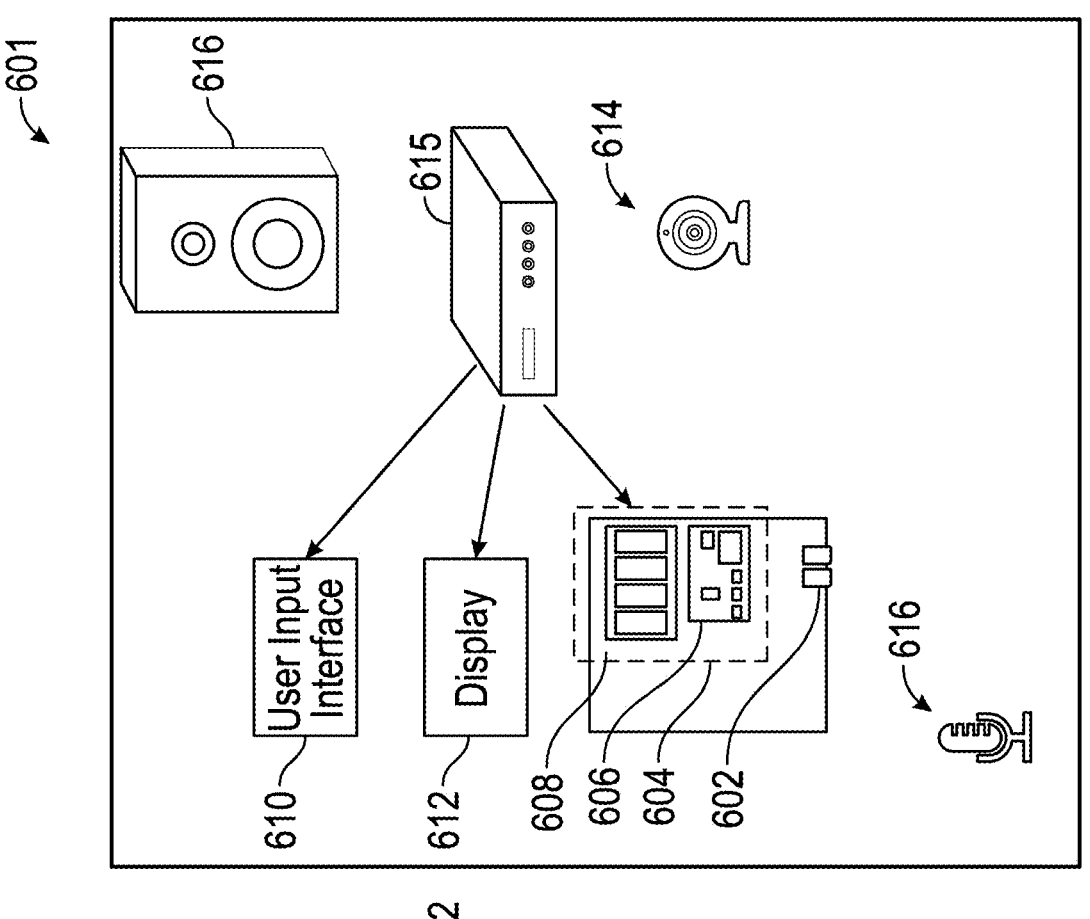
FIG. 6
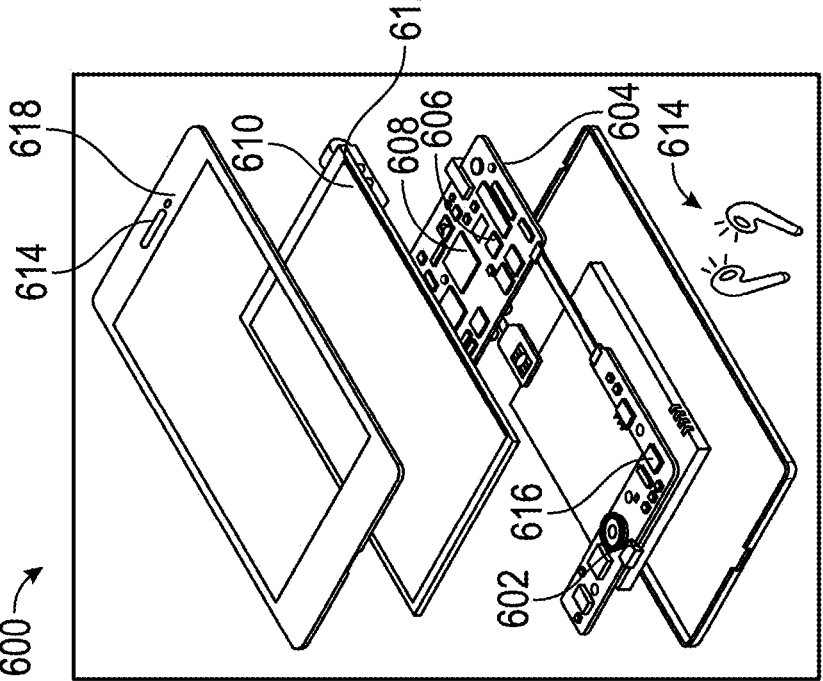

900

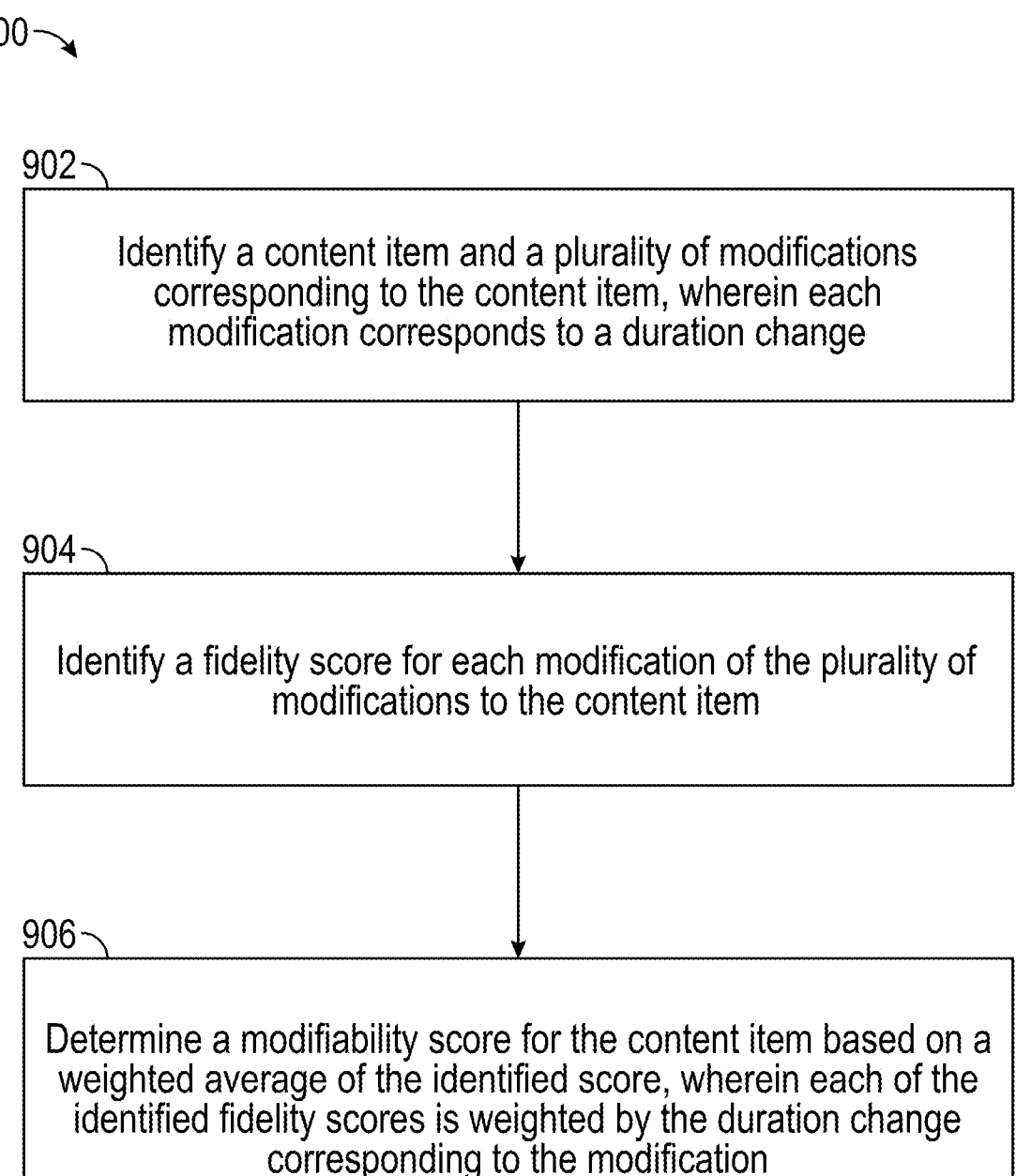

902

Identify a content item and a plurality of modifications corresponding to the content item, wherein each modification corresponds to a duration change

904

Identify a fidelity score for each modification of the plurality of modifications to the content item

906

Determine a modifiability score for the content item based on a weighted average of the identified score, wherein each of the identified fidelity scores is weighted by the duration change corresponding to the modification

FIG. 9

SYSTEMS AND METHODS FOR SYNCHRONIZING PLAYING OF CONTENT WITH FUTURE EVENTS

BACKGROUND

This disclosure is related to systems and methods for synchronizing playing of content with future events.

SUMMARY

Advancements in media recommendation technology have made it possible to deliver content that is highly relevant to users and their immediate context. In some approaches, content (e.g., audio content) is delivered to a user based on the user's progress within other content (e.g., visual content), in order to align the audio and visual stimuli, such as when a certain song within the audio of a movie is played at a visual climax of the movie. However, this effect may be difficult to recreate in real time, absent a user input to manually select a song in hopes of the timing aligning with the user's real-world view, which is a cumbersome and error-prone process (and potentially unsafe if the user is, e.g., driving, biking, or walking on a busy road while attempting to locate the appropriate song on their device for playback). In other approaches, content may be suggested based on a location of a user, social media data, or emotional tags that link content to points of interests (POIs). However, in such approaches, playback of recommended content would abruptly interrupt the current activity of a user (e.g., current content streaming activity).

In another approach, users may manually attempt to construct a playlist that aligns playback of certain content with a desired future time (e.g., corresponding to arrival at a POI). Such an approach is time-consuming, as the user must identify the duration of each content item of the playlist and arrange the content items accordingly. Additionally, this approach is error-prone, as even if the user invested a substantial amount of time to properly align a song on the playlist with the desired future time by summing song durations and comparing the sum to the desired future time, the user cannot always predict and account for dynamic changes in the desired future time (e.g., a delay in the estimated time of arrival associated with increased traffic along a navigation route), which would throw off the timed alignment of the song within the user's carefully planned playlist.

Accordingly, to help address such problems, example systems and methods are provided herein that may allow for a playlist of content items to be dynamically generated and/or modified to ensure that a particular content item (or portion thereof) is played at a designated future time (even if such future time changes unexpectedly). In some embodiments, the systems and methods identify a playlist comprising a plurality of content items (e.g., songs, podcasts, audiobooks, video assets, or the like) having a plurality of durations, respectively. The systems and methods may identify a desired future time at which a time-sensitive content item of the plurality of content items is to be played, e.g., an estimated time of arrival at a POI. The systems and methods may identify a plurality of modifiability scores for the plurality of content items. The systems and methods may determine an estimated playback time of the time-sensitive content item based at least in part on the plurality of durations. The systems and methods may determine that the estimated playback time is different from the identified future time. The systems and methods may modify the playlist by modifying a duration of at least one content item of the plurality of content items to synchronize the estimated playback time of the time-sensitive content item with the identified desired future time. The systems and methods may modify the playlist based at least in part on the plurality of modifiability scores and a difference between the estimated playback time and the identified future time. The systems and methods may cause the modified playlist to be played, including causing the time-sensitive content item to be played at the future time such that the time-sensitive content item is playing when the future time becomes a present time.

Such aspects may enable a playlist being played to a user to be continually and dynamically modified (e.g., based on a time remaining until a future time, such as, for example, arrival at a destination associated with a time-sensitive content item), to ensure the time-sensitive content item (or portion thereof) is played to a user at the desired future time. In some embodiments, the operations described herein, e.g., continual modification of the playlist (and/or continual identification of updated desired future times and/or continual determination of updated estimated playback times for the time-sensitive content item or a portion thereof) may be performed continuously (e.g., without breaking in the processing) or periodically (e.g., with breaks in the processing). Such aspects may avoid a user having to provide manual inputs at a potentially unsafe time and may help avoid abruptly interrupting the user with the desired content. Additionally, such aspects may reduce the need for time-consuming and burdensome user assembly of a playlist such that certain content of the playlist coincides with a (potentially dynamically changing) future time.

The systems and methods can be implemented to minimize the effect of modifications to the user experience by selecting modifications that preserve content item fidelity, thus enhancing overall user satisfaction and engagement. For example, by utilizing modifiability scores of content items in the playlist, the systems and methods may identify candidates for modification (e.g., based on characteristics of those content items and/or a position of the content items within the playlist), to account for any changes to the future time. The systems and methods may enable the advance recommendation, analysis, and/or delivery of content items, alleviating the processing burden (e.g., of a media guidance application), and distributing processing tasks across a larger time frame. For example, instead of receiving a time-sensitive content item from a media server for immediate modification and playback, the systems and methods may buffer the time-sensitive content item for future playback and make incremental changes to the playlist based on updates to the desired future time.

In some embodiments, the systems and methods identify a time-sensitive content item that is not within the plurality of content items of the playlist and retrieve the time-sensitive content item, e.g., from a media server. In some examples, the systems and methods may modify the playlist by inserting the time-sensitive content item into the plurality of content items.

In some embodiments, the systems and methods identify a future time that is associated with a designated timestamp within the time-sensitive content item and additionally determine the estimated playback time based at least in part on the designated timestamp. In such embodiments, the systems and methods causing the modified playlist to be played may include causing the designated timestamp to be played at the future time. For example, the time-sensitive content item may be a song, and the designated timestamp may be associated with a climax of the song.

In some embodiments, the systems and methods modify the playlist by selecting, based on the plurality of modifiability scores, a content item of the plurality of content items (e.g., of the playlist). For example, the systems and methods identify a plurality of fidelity scores corresponding to a plurality of modifications to the selected content item. The systems and methods may then select, based on the plurality of fidelity scores, a modification of the plurality of modifications to the selected content item and modify the selected content item based on the selected modification. In some examples, the selected content item comprises a song, and the selected modification includes at least one of the following: repeating or removing a component of the song (e.g., an instrumental break, a chorus, or a verse of the song); adjusting a tempo of the song; or adding or removing silence at a location within the song (e.g., within a verse, within a chorus, between verses, or between choruses of the song). The content item selected for modification may comprise the identified time-sensitive content item itself.

In some embodiments, each modifiability score of the plurality of modifiability scores is determined by a method that includes identifying a plurality of modifications to a content item of the plurality of content items, wherein each modification corresponds to a duration change. The method may additionally comprise identifying a fidelity score for each modification of the plurality of modifications to the content item. The method may additionally comprise determining the modifiability score corresponding to the content item based on a weighted average of the identified fidelity scores, wherein each of the identified fidelity scores is weighted by the duration change corresponding to the modification. In some examples, the content item of the plurality of content items comprises a song and the plurality of modifications includes at least one of the following: repeating or removing a component of the song (e.g., an instrumental break, a chorus, or a verse of the song); adjusting a tempo of the song; or adding or removing silence at a location within the song (e.g., within a verse, within a chorus, between verses, or between choruses of the song). The method described herein may be performed by a media guidance application, e.g., on a user device, or by a media server.

In some embodiments, the systems and methods modify the playlist by identifying an additional plurality of content items that are not within the plurality of content items (e.g., of the playlist), e.g., from a media server. For example, the systems and methods identify an additional plurality of modifiability scores corresponding to the additional plurality of content items. The systems and methods may then select, based on the additional plurality of modifiability scores, a content item of the additional plurality of content items with a highest modifiability score and insert the selected content item into the plurality of content items. In some embodiments, the systems and methods modify an order of the plurality of content items (e.g., of the playlist) such that content items corresponding to higher modifiability scores are arranged after content items corresponding to lower modifiability scores.

In some embodiments, the identified future time corresponds to an estimated time of arrival at a POI along a navigation route (or a final destination of the navigation route). In such examples, the time-sensitive content item may be associated with the POI (e.g., based on a policy received from an owner of the POI) or a preference received from a user (e.g., through input to a media guidance application). The future time and the estimated time of arrival may change (e.g., in response to determining changes in traffic conditions, changes to planned routes, changes in weather, etc.) For example, the identified future time may be an updated future time (e.g., a future time that has been changed one or more times) and the estimated time of arrival may be an updated estimated time of arrival (e.g., an estimated time of arrival that has changed one or more times). Further, for example, the systems and methods may identify an initial future time at which the time-sensitive content item is to be played based on an estimated time of arrival at the POA. Additionally, for example, the systems and methods may identify the updated future time by updating the initial future time based at least in part on the updated estimated time of arrival. In some examples, the updated estimated time of arrival at the POI is updated based at least in part on detecting increased traffic along the navigation route. In some examples, the future time is continually updated based on continually monitoring the estimated time of arrival until the continually updated future time becomes the present time (e.g., until arrival at the destination). The future time may be continually updated based on regular or irregular triggers. The trigger may be time-based (e.g., updates may occur every second, minute, five minutes, etc.), distance-based (e.g., every mile or five miles travelled), POI-based (e.g., updates may occur at intersections, border-crossings, mile-markers crossed etc.), content-based (e.g., updates may occur at the beginning and/or end of every song), device state-based (e.g., activating or waking the screen or relevant application may trigger an update), or some combination thereof. In some instances, the future time is updated on a continuous or relatively continuous basis (e.g., with little time between updates).

In some embodiments, the future time may be an updated future time and the estimated playback time may be an updated estimated playback time. For example, prior to identifying the updated future time, the systems and methods may identify an initial future time at which the time-sensitive content item of the plurality of content items is to be played. Further, for example, the systems and methods may determine an initial estimated playback time of the time-sensitive content item (e.g., based at least in part on the plurality of durations). Moreover, for example, the systems and methods may determine that the initial estimated playback time is different from the initial future time and may modify the playlist (e.g., by modifying a duration of at least one content item of the plurality of content items) to synchronize the initial estimated playback time of the time-sensitive content item with the initial future time (e.g., based at least in part on the plurality of modifiability scores and a difference between the initial estimated playback time and the initial future time). Additionally, for example, the systems and methods may identify the updated future time based at least in part on determining that the initial future time has changed.

In some embodiments, the systems and methods modify the playlist based on determining that the difference between the estimated playback time and the identified future time exceeds a threshold time. For example, the systems and methods may determine that the difference between the estimated playback time (e.g., 00:00:00 UTC) and the identified future time (e.g., 00:00:05 UTC) is less than a threshold time (e.g., 30 seconds) and determine that the estimated playback time is not sufficiently different from the identified future time. In this example, the systems and methods may not modify the playlist. In some embodiments, the systems and methods modify the playlist based on determining that a present time is within a threshold time of the identified future time or the estimated playback time. For example, the systems and methods may determine that the present time (e.g., 00:00:00 UTC) is not within a threshold time (e.g., one hour) of the identified future time (e.g., 05:00:00 UTC) and may not modify the playlist until the current time is within the threshold time of the identified future time (e.g., until the present time reaches 04:00:00 UTC).

BRIEF DESCRIPTION OF THE DRAWINGS

FIGS. 6-7 show illustrative devices, systems, servers, and related hardware for dynamically modifying a playlist to synchronize content playback, in accordance with some embodiments of this disclosure;

FIG. 9 is a flowchart of a process for determining modifiability scores of content items, in accordance with some embodiments of the present disclosure.

DETAILED DESCRIPTION

The present disclosure describes, at least in part, systems and methods for the dynamic modification and/or generation of content item playlists to ensure that a particular content item (or portion thereof) is played at a designated (and potentially dynamically changing) future time.

Figure 1A:
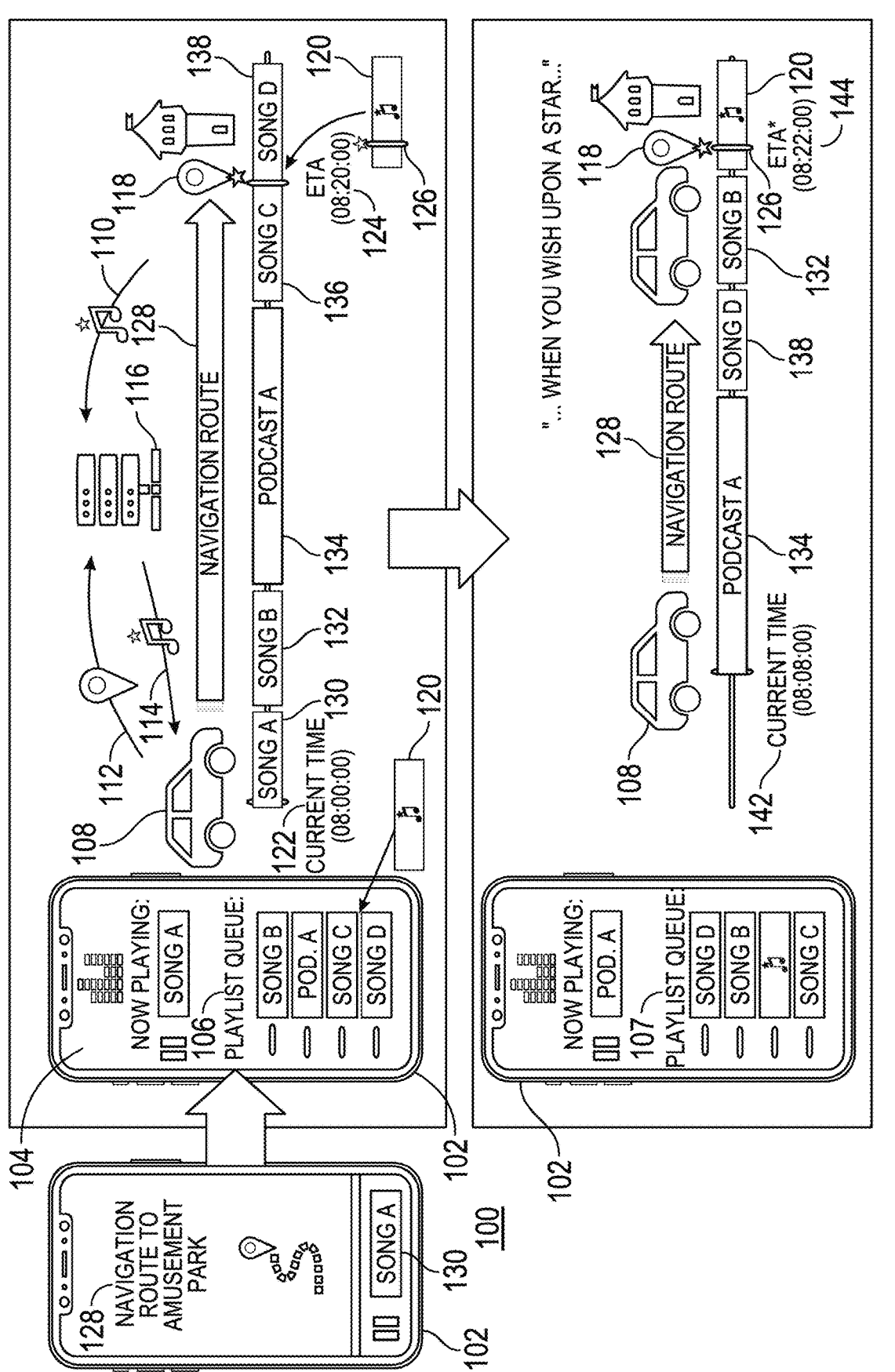
FIGS. 1A-1C show an illustrative system for dynamically modifying a playlist to synchronize the playback of audio with arrival at a POI along (or at a final destination of) a navigation route, in accordance with some embodiments of this disclosure.
Figure 1B:
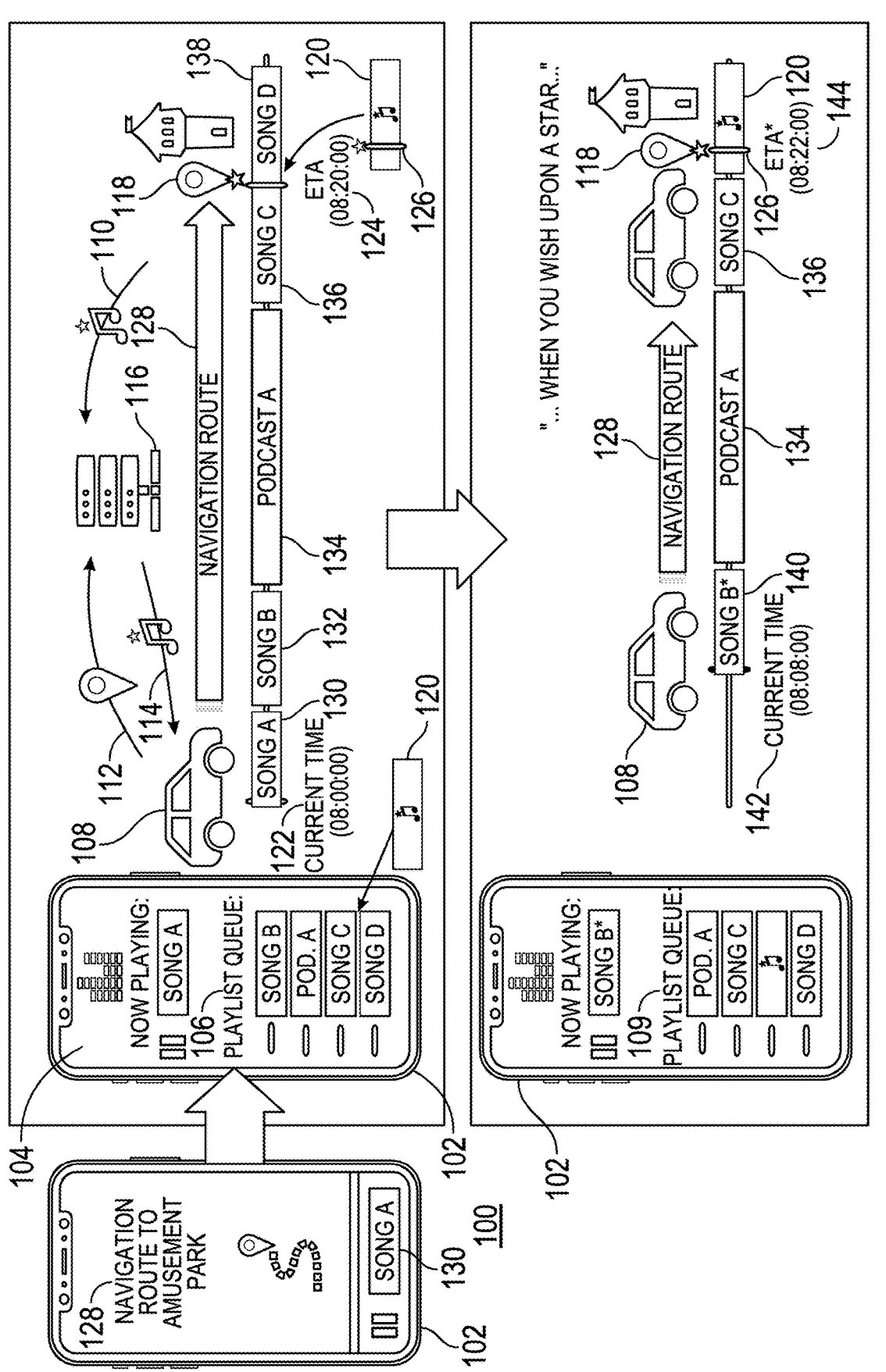
Figure 1C:
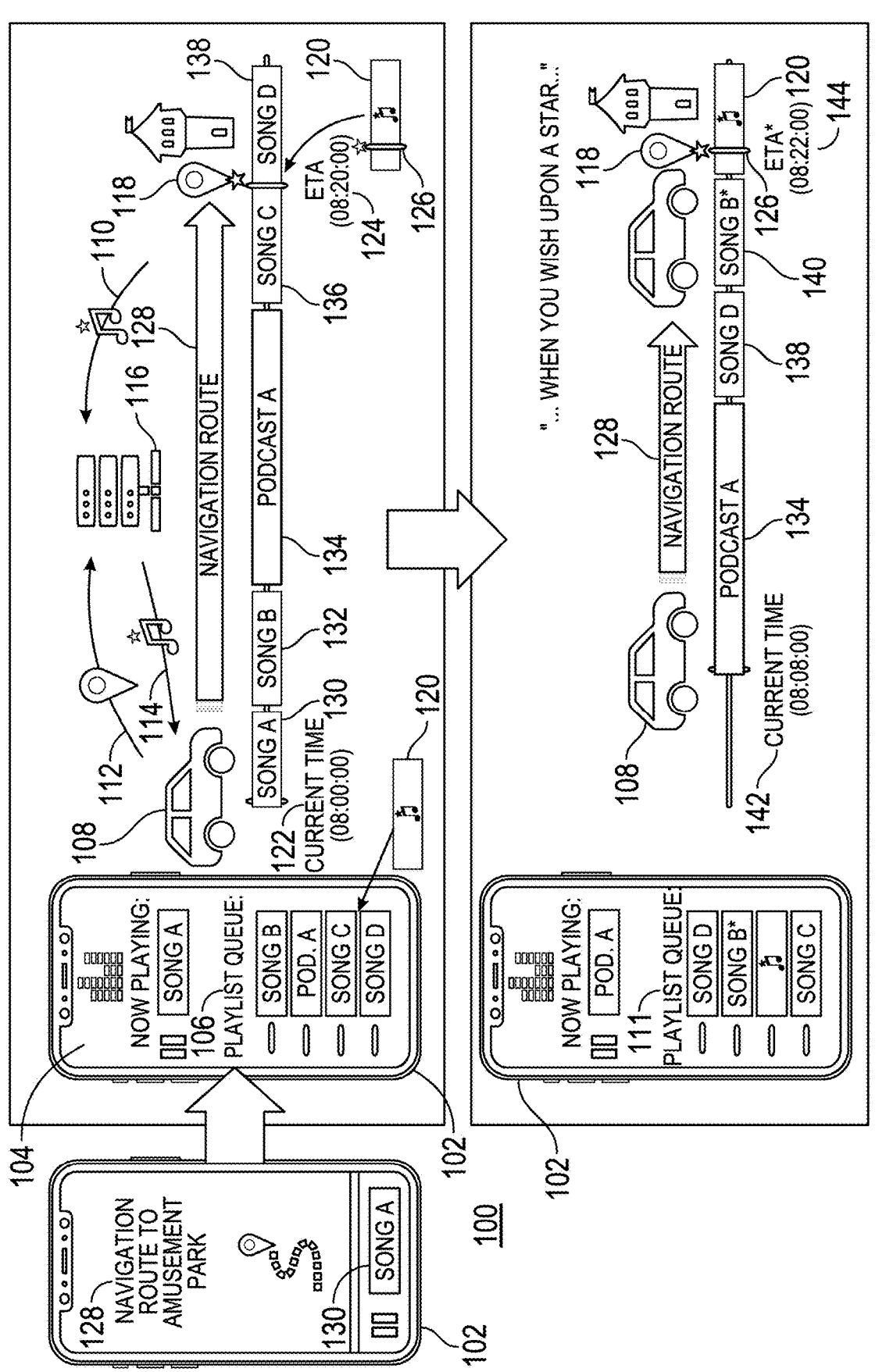

FIGS. 1A-1C show an illustrative content synchronization system 100 for dynamically modifying a playlist to synchronize the playback of audio with arrival at a POI along a navigation route (or POI that is a final destination of the navigation route), in accordance with some embodiments of this disclosure. As shown in FIG. 1A-1C, in some embodiments, the content synchronization system 100 comprises or corresponds to one or more applications executed at least in part at user device 102 (e.g., a smartphone and/or a device located within a vehicle 108), a media server 116, and/or any other suitable devices, servers, databases and/or other components. In some embodiments, user device 102 may be, for example, a headset; a mobile device such as, for example, a smartphone or tablet; a laptop computer; a personal computer; smart watch or wearable device; smart glasses; an extended reality (XR) head-mounted display (HMD); a stereoscopic display; a wearable camera; XR glasses; XR goggles; a near-eye display device; or any other suitable user equipment or device capable of connecting to the Internet or other suitable network; or any combination thereof.

The content synchronization system 100 may be executed at least in part at one or more user devices (e.g., user device 102) and/or at one or more remote media servers (e.g., media content source 702 and/or server 704 of FIG. 7, third-party service 204 and/or song-streaming service 206, and/or cloud database 210 of FIGS. 2-5) and/or at any other suitable computing device(s). The content synchronization system 100 may be configured to perform the functionalities (or one or more portions thereof) described herein. In some embodiments, the content synchronization system 100 may comprise or be incorporated as part of any suitable application or software. For example, the content synchronization system 100 may comprise or be implemented in conjunction with one or more navigation applications; one or more media (e.g., audio and/or video) streaming applications; one or more media guidance applications; one or more scheduling applications; one or more reminder applications; one or more timer applications; one or more XR applications; one or more content delivery network (CDN) applications; one or more network management applications; one or more video game applications including cloud gaming applications; one or more image, video, and/or textual acquisition, recognition and/or processing applications; one or more content creation applications; one or more machine learning models or artificial intelligence models; or any other suitable application(s) or any combination thereof; and/or may comprise or employ any suitable number of displays, sensors, or devices (e.g., in conjunction with a vehicle 108) such as those described in FIGS. 1-9; or any other suitable software and/or hardware components; or any combination thereof.

"XR" may be understood as virtual reality (VR), augmented reality (AR) or mixed reality (MR) technologies, or any suitable combination thereof. VR systems may project images to generate a 3D environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

As shown in FIGS. 1A-1C, the content synchronization system 100 identifies a navigation route 128 (e.g., to destination 118, such as, for example, an amusement park) on a user device 102 located within vehicle 108 (e.g., currently playing a song A 130 on media application 104). For example, content synchronization system 100 identifies the navigation route 128 based on receiving an indication from a navigation application (e.g., Google Maps or other GPS system), and/or such navigation application may be integrated into content synchronization system 100. In some examples, the navigation route 128 is associated with a POI selected by the user (e.g., based on a search for POIs, from a list of recommended POIs, or the like) or otherwise based on user preferences or historical user activity (e.g., a user traveling to work at a same time each weekday). In another example, the navigation route 128 is associated with a location manually indicated by the user on a map (e.g., of the navigation application). Further, for example, the content synchronization system 100 identifies the navigation route 128 based on information provided by one or more systems of a vehicle (e.g., positional systems of an airplane). In some examples, the content synchronization system 100 synchronizes content item playback with the view from an airplane or other aerial vehicle, e.g., based on the information provided by a positional system of the airplane. While vehicle 108 is shown as a car in FIG. 1, vehicle 108 may alternatively be, for example, a bicycle, a motorcycle, a boat, a scooter, or any other suitable vehicle, or any combination thereof. In some embodiments, a user may be traveling to destination 118 by foot (e.g., walking, running, or jogging), or may be riding public transit, e.g., a train, subway, bus, or any other suitable transit system. In some embodiments, the future time may not be associated with a POI being navigated to by a user, but instead may correspond to, e.g., when a particular sports game starts, an alarm going off, when a user is to be picked up by, e.g., their parents or friends at a location, or any other suitable future time, or any suitable combination thereof.

In some embodiments, the content synchronization system 100 sends a request 112 indicating the destination 118 (e.g., an amusement park, such as, for example, Disney World) to a media server 116 and receives a response 114 that indicates a time-sensitive content item 120 associated with the destination 118 from the media server 116. For example, Disney World may operate media server 116, or otherwise provide an indication to media server, to associate one or more songs (e.g., "When You Wish Upon a Star," a well-known song from Disney movies) with a user's arrival at Disney World. In some examples, the response 114 includes an indicator of the time-sensitive content item 120, while in another example, the response 114 includes the time-sensitive content item 120 itself. In some embodiments, the destination 118 is a POI and the time-sensitive content item 120 is associated to the destination 118 by a request 110 from a third-party service (e.g., for the POI). For example, the request 110 includes an identifier of the time-sensitive content item 120 and/or a designated timestamp 126 (e.g., a chorus of a song, such as, for example, "When You Wish Upon a Star . . . ") within the time-sensitive content item 120, e.g., to be played upon arrival at the destination 118. The indicated time-sensitive content item may include at least one of a song (e.g., song A 130, song B 132, song C 136, song D 138), a podcast (e.g., podcast A 134), a video asset (e.g., television show episode and/or highlight, movie clip, or the like), or any other suitable content, or any suitable combinations of the same.

In some embodiments, the content synchronization system 100 identifies a future time 124 at which the time-sensitive content item 120 is to be played. For example, the user equipment 102 (e.g., media application 104 of user equipment 102) receives, at a current time 122 (e.g., 08:00:00 UTC), the response 114 that includes the indication of a future time 124 (e.g., 08:20:00 UTC) corresponding to an estimated time of arrival (ETA) at the destination 118. In some examples, the response 114 indicates the future time 124 based on a remaining travel time (RTT) to the destination 118, and/or system 100 determines the RTT based on the received future time 124 (e.g., corresponding to the ETA).

In some embodiments, the content synchronization system 100 identifies a playlist 106 including a plurality of content items (e.g., including song A 130, song B 132, song C 136, song D 138, and podcast A 134) being played by the user equipment 102, e.g., by the media application 104 at the current time 122. For example, the content synchronization system 100 identifies that each content item of the plurality of content items has a corresponding duration. In some embodiments, the content synchronization system 100 identifies that the time-sensitive content item 120 is not within the plurality of content items of the playlist 106. In some examples, the content synchronization system 100 inserts the time-sensitive content item 120 into the playlist 106, e.g., such that the beginning of the time-sensitive content item 120 and/or the designated timestamp 126 is as close to the identified future time 124 as possible (e.g., between song C 136 and song D 138). In another example, the content synchronization system 100 creates and/or selects an alternative playlist, where playback of the beginning of the time-sensitive content item 120 and/or the designated timestamp 126 would occur at or close to the identified future time 124. In this example, the content synchronization system 100 may create or select the alternative playlist based on a degree of similarity to the time-sensitive content item 120. For example, the time-sensitive content item 120 is a song (e.g., from a movie), and the content synchronization system 100 may select at least one of the following content items to include in the created alternative playlist: other songs from the movie, songs with a similar genre to the time-sensitive content item 120, remixes of the song, portions of the movie, combinations of the same, or the like.

In some embodiments, the content synchronization system 100 determines an estimated playback time of the time-sensitive content item 120. For example, the content synchronization system 100 determines the estimated playback time of the time-sensitive content item 120 based on adding the durations of the content items positioned before the time-sensitive content item 120. In some embodiments, the content synchronization system 100 determines the estimated playback time of the designated timestamp 126 within the time-sensitive content item 120 based on adding a duration corresponding to the designated timestamp 126 to the sum of the durations of the content items positioned before the time-sensitive content item 120. In some examples, the content synchronization system 100 determines a remaining playback time (RPT) corresponding to the difference in time between the estimated playback time and the current time (e.g., current time 122 or current time 142).

In some embodiments, the content synchronization system 100 determines that the estimated playback time is different from the identified future time (e.g., ETA 124). For example, the content synchronization system 100 determines a difference between the estimated playback time and the identified future time (e.g., or a difference between the RTT and RPT) exceeds a particular threshold time (e.g., five seconds, one minute, or the like). Further, for example, the content synchronization system 100 identifies an updated future time (e.g., ETA* 144 of 08:22:00 UTC) for playback of the time-sensitive content item, where the difference is determined between the estimated playback time and the updated future time. In some examples, the updated future time is determined based on detecting a delay in the navigation route 128 (e.g., increased traffic along the navigation route 128, additional stop added to the navigation route 128, a wrong turn that delays the arrival time, detected slowdown of vehicle 108, or any suitable form of delay, or any suitable combination thereof). For example, content synchronization system 100 may dynamically modify the playlist (e.g., rearranging content items on the playlist and/or modifying a duration of one or more content items on the playlist) in real time, based at least in part on determining that the identified future time (e.g., is now earlier than initially expected or is now later than initially expected) is different than the estimated playback time of the time-sensitive content item. In some embodiments, if a playlist is, e.g., paused, or a user skips, fast-forwards, or rewinds through one or more content items in the playlist, content synchronization system 100 may account for these changes by altering one or more portions of the playlist to cause the time-sensitive content item to be played upon (or within threshold time of) arrival at the destination.

In some embodiments, the content synchronization system 100 modifies the playlist 106 based on determining that the estimated playback time is different from the identified future time. For example, at a second time (e.g., current time 142 of 08:08:00 UTC), the content synchronization system 100 determines that the estimated playback time (e.g., 08:21:30 UTC) and the identified future time (e.g., 08:22:00 UTC) are different, e.g., based on exceeding a threshold of 15 seconds. As shown in FIG. 1A, in some embodiments, based on the determined difference, the content synchronization system 100 modifies the playlist 106 by rearranging the content items within the playlist 106 (e.g., changing the order of song A 130, song B 132, song C, 136, song D 138, and podcast A 134) without modifying the duration of any of the content items (e.g., to become modified playlist 107). For example, the content synchronization system 100 modifies the order of the content items within the playlist 106 (e.g., to become modified playlist 107) based on a plurality of identified modifiability scores (MS) corresponding to the plurality of content items. Further, for example, the content synchronization system 100 modifies the order of the content items within the playlist 106 such that content items with a lower respective MS are positioned earlier within the playlist 106, e.g., than content items with a higher respective MS. Additionally or alternatively, for example, the content synchronization system 100 may insert one or more content items having similarities to the time-sensitive content item 120 to synchronize the time-sensitive content item 120 (or designated timestamp 126 thereof), e.g., based on the MS of the inserted one or more content items. Moreover, for example, the content synchronization system 100 may remove content items (or portions thereof) from the playlist 106 to synchronize the time-sensitive content item 120 (or designated timestamp 126 thereof) to the updated future time.

As shown in FIG. 1B, in some embodiments, the content synchronization system 100 modifies the playlist 106 (e.g., to become modified playlist 109) by modifying one or more durations of content items within the playlist 106. For example, the content synchronization system 100 modifies the playlist 106 (e.g., to become modified playlist 109) by modifying a content item (e.g., song B 132 modified to become song B* 140), e.g., without rearranging the content items of the playlist. Further, for example, the modified content item may correspond to the time-sensitive content item 120 itself. In this example, the modifications to the time-sensitive content item 120 may be limited to the portion of the time-sensitive content item 120 occurring before the designated timestamp 126. The content synchronization system 100 may perform the modification of the content item (e.g., song B 132) or alternatively replace the content item (e.g., song B 132) with the modified content item (e.g., song B* 140), e.g., received from media server 116 or otherwise modified at user device 102.

As shown in FIG. 1C, in some embodiments, the content synchronization system 100 determines a new estimated playback time of the time-sensitive content item 120 based on the modified playlist (e.g., modified playlist 107), For example, the content synchronization system 100 determines that new estimated playback time and the identified future time 144 are different, e.g., based on the difference exceeding a time threshold. Further for example, the content synchronization system 100 may further modify a previously modified playlist (e.g. playlist 107 modified by rearranging content items) by modifying one or more durations of the content items of the playlist (e.g., to become modified playlist 111). In some examples, the content synchronization system 100 modifies the duration of the song B 132 to become modified song B* 140, e.g., arranged in the order of modified playlist 107.

In some embodiments, the content synchronization system 100 causes the modified playlist 107 to be played, e.g., during the navigation route 128, such that the time-sensitive content item 120 (or designated timestamp 126 thereof) is played at the identified future time 144 (e.g., upon arrival at the destination 118 or upon reaching a location within a threshold distance from destination 118). For example, the content synchronization system 100 may dynamically modify the playlist 106 (e.g., additionally modify modified playlist 107) throughout the duration of the navigation route 128. Further, for example, the content synchronization system 100 begins dynamically modifying the playlist 106 based on determining that the current time (e.g., current time 122 or current time 142) is within a threshold time of the identified future time (e.g., identified future time 124 or identified future time 144) and/or the estimated playback time.

In some embodiments, the future time may depend in part on a time specified by, e.g., the amusement park (e.g., Disney may indicate to play "when you wish upon a star" at a location once *Cinderella*'s castle in the Magic Kingdom amusement park comes into view on the highway, even if the user has not yet arrived at the entrance for the Magic Kingdom amusement park, or a time specified by the user, e.g., the user may want the song to be played when he or she pulls into the parking lot of the amusement park, or in another example, the user may want the chorus of "Sweet Home Alabama" to be played when he or she crosses the state line into Alabama or pulls into their driveway or garage at home.

In accordance with some embodiments of the present disclosure, systems and methods for modifying a playlist to make playback of a time-sensitive content item coincide with arrival at a location based on RTT and RPT are described as follows.

In some embodiments, the content synchronization system receives an indication (e.g., from a business) that arrival at a location should coincide with playback of a time-sensitive content item (e.g., a designated timestamp of the time-sensitive content item). In some embodiments, the content synchronization system detects that a user (e.g., corresponding to user equipment 102 of FIG. 1) is navigating towards a point of interest along and/or at the final destination of a route (e.g., navigation route 128 of FIG. 1). In some embodiments, the content synchronization system retrieves the indicated time-sensitive content item and designated timestamp (e.g., from media server 116 of FIG. 1). In some embodiments, the content synchronization system identifies content items from a playlist (e.g., a currently playing playlist 106 of FIG. 1) that may be easily modified to synchronize RPT with RTT (e.g., based on MSs). In some embodiments, the content synchronization system arranges the playlist such that RPT matches RTT within a threshold and/or the most modifiable content items are played immediately before arrival at the location (e.g., based on MSs). In some embodiments, the content synchronization system monitors for changes in RTT and continues to reorder the playlist and/or modify durations of content items to align the RPT and RTT. For example, the content synchronization system modifies the duration of content items based on determining that reordering the playlist is not sufficient to synchronize RPT with RTT.

In accordance with some embodiments of the present disclosure, systems and methods for modifying the duration of content items are described as follows.

In some embodiments, the content synchronization system modifies the duration of a content item while preserving the integrity of the content item. For example, the content synchronization system modifies the duration of the content item by using natural language processing (NLP) and acoustic analysis to detect repeated sections with the content item. Further, for example, the content item is a song, and the repeated sections correspond to at least one of choruses, verses, instrumental segments, combinations of the same, or the like. In this example, the repeated sections may be detected based on the NLP identifying repetitive lyrical content and the acoustic analysis identifying similar musical patterns. Moreover, for example, the content synchronization system uses the detected repeated sections to extend the duration of the content item by repeating a section an additional time or shorten the song by omitting one of the repetitions of the section. In some examples, the content synchronization system identifies a chorus section of a song that is repeated twice and shortens the song by removing an occurrence of the chorus section or lengthens the song by adding an occurrence of the chorus section.

In some embodiments, the content synchronization system modifies the duration of the content item by adjusting the speed of playback of the content item. For example, the content item is a song, and the content synchronization system adjusts the tempo of the song, e.g., speeding up playback of the song or slowing down playback of the song. Further, for example, the content synchronization system adjusts the speed of playback of the content item using time-stretching algorithms that alter the tempo of the playback without changing the pitch of the audio asset. (e.g., ensuring musical coherency of a song). Moreover, for example, the tempo of a song is adjusted within a range of 5 to 10 percent difference in tempo magnitude, depending on the structure or genre of the song. In this example, the tempo changes may be applied uniformly across the song to maintain synchronization of beats, e.g., to achieve seamless modification. In some examples, the content synchronization system continually monitors the estimated playback time (e.g., or RPT) and/or the identified future time (e.g., RTT) to determine if further tempo adjustments are necessary (e.g., as the user approaches a POI). The continual monitoring may be regular or irregular and may be based on any suitable trigger (e.g., time-based, distance based, content-based, etc.). In some instances, the continual monitoring may be continuous or relatively continuous (e.g., with few or no breaks between instances of monitoring).

In some embodiments, the content synchronization system modifies the duration of the content item by inserting brief blackouts (e.g., silence in an audio asset, black screen in a video asset) at strategic points within the content item. For example, the modified content item is a song, and blackouts corresponding to periods of silence are inserted within a verse of the song, within a chorus of the song, between a verse and chorus of the song, between choruses of the song, between verses of the song, combinations of the same, or the like. Further, for example, the brief blackouts have short durations (e.g., measured in fractions of a second), and are placed in locations that are least likely to disturb the flow of the content item. In some embodiments, the content synchronization system modifies the duration of the content item by identifying blackouts and/or extended sections of the content item and shortening and/or eliminating the blackouts (e.g., naturally occurring pauses, black screen transitions) and/or extended sections of the content item. For example, the content synchronization system identifies an extended instrumental section and trims the duration of the extended instrumental section without affecting the core musical content of the song.

In some embodiments, the content synchronization system modifies the duration of the content item based on a plurality of fidelity scores (FSs) corresponding to a plurality of modifications to the content item. For example, the content synchronization system selects, based on the plurality of fidelity scores, a modification of the plurality of modifications to the selected content item and modifies the selected content item based on the selected modification. In some examples, the content synchronization system identifies the fidelity scores by accessing a database that contains the content items, their corresponding FSs, and/or a modification (e.g., removal of a repeated section, insertion of blackout, increased tempo). Moreover, for example, the content synchronization system selects a modification corresponding to the greatest FS (e.g., with the greatest retention of the song's original qualities). In another example, the content synchronization system selects a modified content item to add to the playlist based on at least one of the following: the subject matter or genre of the playlist and/or time-sensitive content item, the FS of each modification to the content item; the estimated playback time and/or RPT; the identified future time and/or RTT; combinations of the same; or the like.

In accordance with some embodiments of the present disclosure, systems and methods for calculating FSs for assessment of the impact of modifications on the original quality of content items are described as follows.

In some embodiments, the content synchronization system uses FSs determined through human-based evaluation of modified content items. For example, the FSs are determined based on human reviewers who evaluate various modified versions of content items (e.g., from different genres, artists, producers, or the like). Further, for example, the human evaluators are asked to rate the modified versions of the content item based on how closely they retain the original qualities (e.g., emotional impact, atmosphere, or the like) of the unmodified content item. Moreover, for example, the FS for each modified version is determined based on the rankings of the human evaluators.

In some embodiments, the content synchronization system uses FSs determined through computational analysis. For example, the FSs are determined using digital signal processing (DSP) techniques to break down an audio asset of a content item into basic components including frequency, amplitude, and/or time. Further, for example, the FSs are determined based on converting raw audio waveforms of the content item into a digital format, which is further analyzed using mathematical techniques such as the Fourier transform, e.g., to separate the audio signals into their constituent frequencies. Additionally, for example, tempo detection, key detection, time signature analysis, combinations of the same, or the like are performed on the digitized audio signal. In some examples, the tempo detection is performed by detecting peaks in the signal that correspond to beats per minute (BPM), e.g., to determine a rhythmic structure. In another example, the key detection is performed by analyzing the harmonic content of the audio signal (e.g., corresponding to a song) to identify a musical key. For example, a tempo change increases the key above a set number of steps (e.g., from G major to G minor), which is determined to change a quality of the content item (e.g., changing the feeling from cheerful to gloomy). In this example, the key of the audio signal is determined by mapping frequencies present in the audio signal to musical notes and determining the key based on the prominence of certain notes. In some embodiments, the FSs are determined based on detection of various metrics (e.g., of the audio asset of the content item) including at least one of the following: meter and/or time signature (e.g., 3/4, 4/4); dynamics; volume and/or intensity; rhythmic structure; harmonic content; combinations of the same; or the like.

In some embodiments, the content synchronization system uses FSs determined through machine learning (ML). For example, the FSs are determined based on an ML model learning from a dataset or training data of modified content items, e.g., analyzed by human-based evaluation and/or computational analysis techniques. Further, for example, the ML model is trained to recognize patterns in the data that correspond to high or low fidelity scores by analyzing content item features including plot and/or storyline, repetitions, pauses, lyrical content, dialogue, tempo, key, structure, dynamics, combinations of the same, or the like. Moreover, for example, the trained ML model evaluates new content items and the modifications applied to them to calculate an FS for the modified content item, e.g., to predict how well the modifications retain the content item's original characteristics.

In accordance with some embodiments of the present disclosure, example modifications and their corresponding FSs are described as follows.

In some examples, FSs are assigned on a scale of 0 to 1 to modified versions of a song, where a FS of 0 indicates that the original quality of the song is not preserved and a FS of 1 indicates that the original quality of the song is completely preserved. For example, a modification corresponding to adding silence (e.g., between one and three seconds of silence) to the beginning or end of the song may be assigned a FS of 0.9-1.0, e.g., based on the modification only minimally disrupting the flow of the song. Further, for example, a modification corresponding to repeating the chorus may be assigned a FS of 0.8, e.g., based on the modification providing a natural, but noticeable, extension to the song. Moreover, for example, a modification corresponding to adjusting the tempo of the song (e.g., by +/−5%) may be assigned a FS of 0.85, e.g., based on the modification retaining the musicality of the song but causing a slight perceptual change. Additionally, for example, a modification corresponding to adding silence in the middle of the song (e.g., during an instrumental break) may be assigned a FS of 0.5, e.g., based on the modification disrupting the flow of the song. In some embodiments, the content synchronization system determines a three-second extension of the song is required (e.g., to synchronize the time-sensitive content item with the future time) and selects the modification corresponding to adding three seconds of silence at the end of the song based on the modification having the highest FS, e.g., and thus being the optimal modification.

In some embodiments, the content synchronization system determines the FS based on at least one of the following: the amount of blackout (e.g., silence) added during a modification (e.g., $t_{si}$ for the ith modification); a percentage change in content item tempo (e.g., $p_t$); a number of times sections of the content item are repeated (e.g., $n_r$); combinations of the same (e.g., and/or functions of the same); or the like. For example, the content synchronization may calculate a FS in accordance with the following equation:

$$fs = \left(\prod_{i=1}^{n} f_s(t_{si})\right) \times f_t(p_t) \times f_r(n_r)$$

where $f_s(t_{si})$, $f_t(p_t)$, and $f_r(n_r)$ are non-linear functions that calculate the impact of each respective modification on the content item's fidelity. In this example, the non-linear functions $f_s(t_{si})$, $f_t(p_t)$, and $f_r(n_r)$ may calculate negligible impact on the FS for small magnitude modifications but have a greatly increased impact on the FS with larger magnitude modifications.

In some embodiments, the content synchronization system selects a content item (e.g., of the playlist) to modify based on a plurality of modifiability scores (MSs). In such embodiments, the MS of a content item may reflect how adaptable the corresponding content item is across modifications of different lengths, e.g., while retaining the original quality of the content item. For example, the content synchronization system selects the content item corresponding to the highest MS to modify (e.g., based on the modification of the selected content item with the highest FS).

In accordance with some embodiments of the present disclosure, systems and methods for calculating MSs for a content item are described as follows.

In some embodiments, the content synchronization system analyzes a song for its modifiability based on identifying a plurality of modifications and identifying and/or determining a corresponding plurality of FSs. For example, for each content item, the content synchronization system generates multiple versions of the content item corresponding to different durations (e.g., +/−1 second, +/−2 seconds, +/−n seconds of the original duration). Further, for example, the content synchronization system generates multiple versions of the content item for each duration corresponding to different modifications (e.g., generating versions corresponding to a duration change of +1 second includes adding 1 second of silence to the beginning of the content item, adding one second of silence between verses of the content item, or repeating a verse of the content item). In some embodiments, the content synchronization system identifies a corresponding FS for each version of the content item (e.g., from a database comprising predetermined FSs). In some embodiments, the content synchronization system determines a FS for each version of the content item, e.g., while dynamically modifying the playlist.

In some embodiments, the content synchronization system calculates a MS for a content item based on a weighted average of the optimal modification (e.g., corresponding to the highest FS) for each duration change (e.g., +1 second, −2 seconds, or the like). For example, the MS may be calculated by calculating a weighted average where the FS of the optimal modification for each duration change is multiplied by the duration change in accordance with the following equation:

$$MS = \frac{\sum_{j=1}^{m} FS_j \times L_j}{\sum_{j=1}^{m} L_j}$$

where $FS_j$ is the highest FS among all modifications for the j-th duration change, $L_j$ is the duration change, and m is the total number of different duration changes.

In some embodiments, the content synchronization system generates multiple modifications of a content item for each desired duration change, calculates a FS for each modification, selects a highest FS for each duration change as the optimal modification, and aggregates the optimal FSs to compute the overall MS of the content item. In some embodiments, the content synchronization system only calculates the FS, selects the optimal FSs, and calculates the overall MS for each content item, without making any modifications to the content item. The FSs (e.g., optimal FSs and their corresponding optimal modifications) and/or MSs may be stored for future use in a database (e.g., a local database and/or cloud database). In such embodiments, the calculation of FSs (e.g., optimal FSs) and/or MSs may occur prior to content synchronization, e.g., via playlist modification. For example, the content synchronization system may retrieve a content item's MS, FSs, and/or an optimal modification (e.g., corresponding to the optimal FS) from a local database (e.g., of user equipment 102 of FIG. 1 and/or user equipment 707, 708, or 710 of FIG. 7) and/or cloud database (e.g., a database associated with a media server 116 of FIG. 1 and/or database 705 of FIG. 7). Further, for example, if the indicated content item (e.g., content item positioned before the time-sensitive content item in the playlist) does not have pre-processed scores (e.g., FSs, MSs, or the like), the content synchronization system may perform the FS and/or MS calculations at the user equipment (e.g., at user equipment 102 of FIG. 1 and/or user equipment 707, 708, or 710 of FIG. 7). The content synchronization system may perform such FS and/or MS calculations as needed, e.g., for additional content items in the playlist based on identified traffic delaying the ETA by an hour.

In some embodiments, the MS and/or FS determinations for content may be based at least in part on a content type. For example, different content can tolerate more stretching or modification, e.g., it may not be desirable to modify certain songs, such as fast-paced songs or well-known popular songs, at all, whereas other content, such as a podcast (or advertisements), may be deemed fine to modify (e.g., speed up to 1.5× speed from normal 1.0 speed) as it minimally impacts the user experience; and some can't be modified at all. In some embodiments, the MS and/or FS may be based at least in part on user preferences for certain content, artists, actors, types of content, whether content is trending, and/or any other suitable preferences or content characteristics.

In some embodiments, after the content synchronization system plays a content item, such content item is removed as a candidate for rearrangement in the playlist and/or for duration modification in order to align playing of one or more portions of the time-sensitive content item at the future time or an updated future time, e.g., once Song A is finished playing in FIGS. 1A-1B, candidates for medication may be Song B, Podcast A, Song C, and/or Song D. For example, even if the content synchronization system identifies a song A as the best candidate for modification (e.g., based on MSs), the content synchronization system does not modify song A in the playlist based on determining that song A has already been played.

Figure 2A:
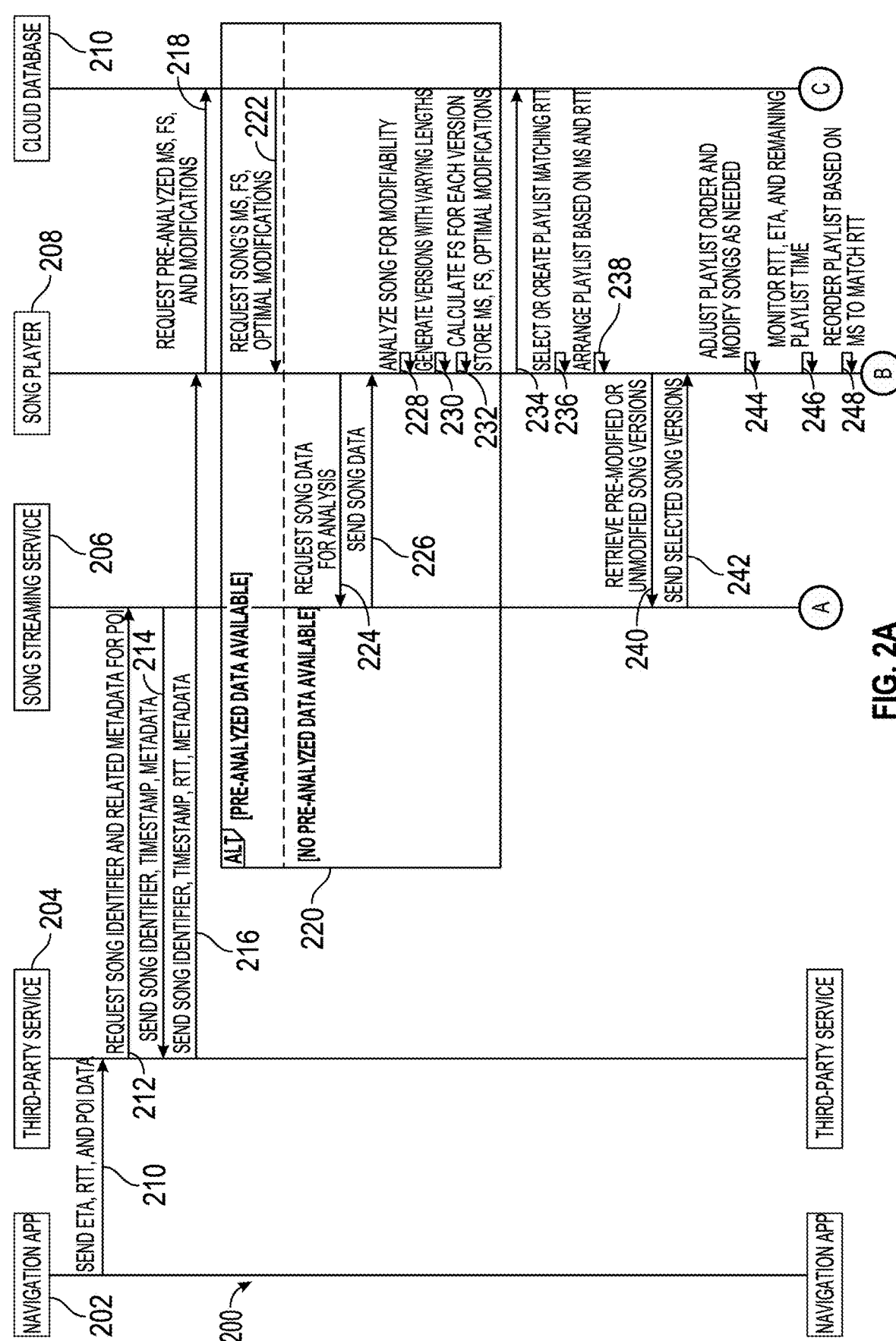
FIGS. 2A-2B are a flow diagram of an example process for dynamically modifying a playlist of songs to synchronize playback of a song with arrival at a POI, in accordance with some embodiments of the present disclosure.
Figure 2B:
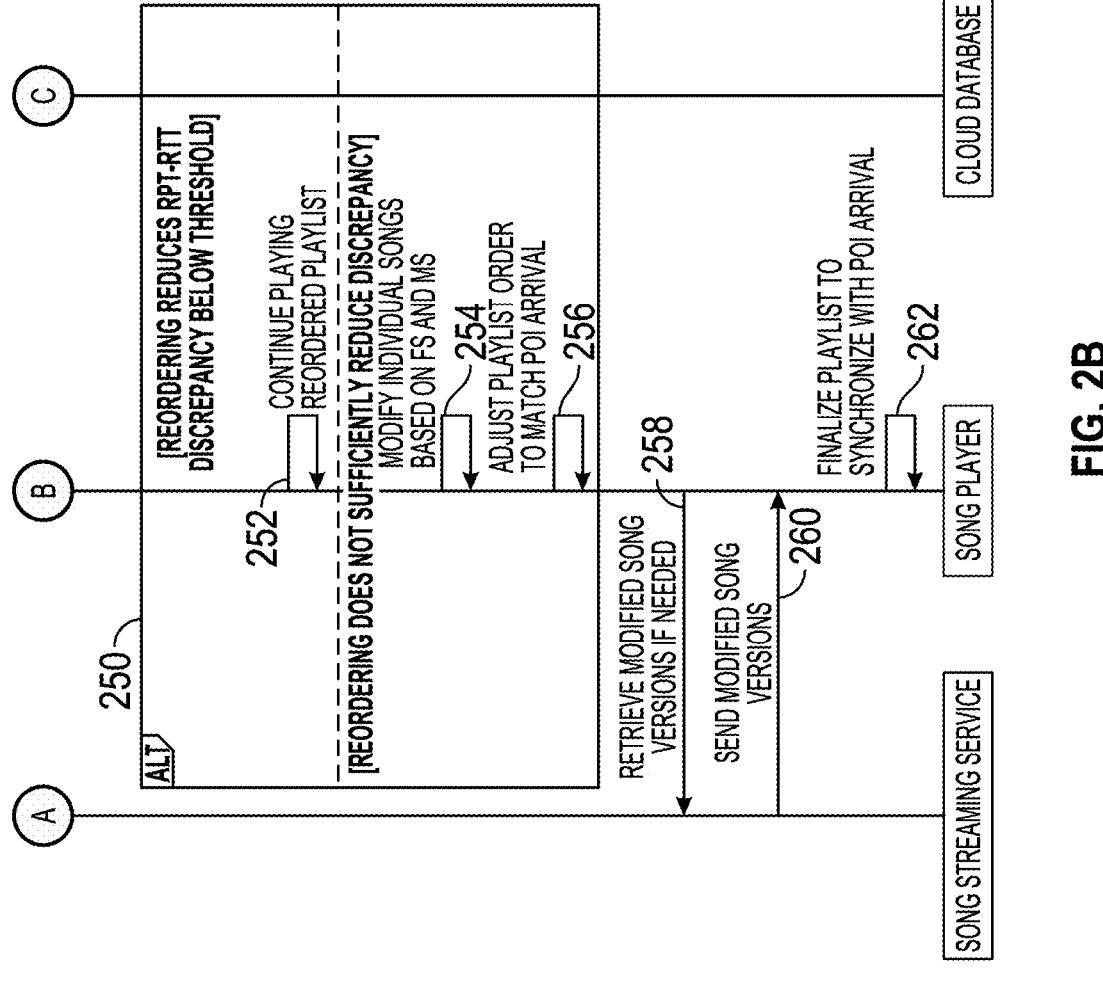

FIGS. 2A-2B are a flow diagram of an example process 200 for dynamically modifying a playlist of songs to synchronize playback of a song with arrival at a POI, in accordance with some embodiments of the present disclosure. As shown in FIG. 2, in some embodiments, the content synchronization system (e.g., including navigation app 202, third-party service 204, song streaming service 206, song player 208, and/or cloud database 210) arranges the order of content items (e.g., songs) within a playlist based on the MSs of the content items within the playlist. In some examples, the content synchronization system arranges the content items such that content items corresponding to higher MSs are arranged later in the playlist, e.g., closest to the identified future time. In another example, the content synchronization system arranges the content items such that content items corresponding to higher MSs are evenly interspersed and/or sequentially arranged with content items corresponding to lower MSs, e.g., in the portion of the playlist preceding the identified future time.

At 210, the navigation app 202 may send an ETA (e.g., and/or identified future time 124 or 144 of FIG. 1), an RTT, and/or POI data (e.g., of destination 118 of FIG. 1) to the third-party service 204. At 212, the third-party service 204 may request a song identifier (e.g., for a time-sensitive content item) and/or related metadata for the POI from song-streaming service 206. At 214, the song streaming service 206 may send the song identifier (e.g., for the time-sensitive content item 120 of FIG. 1), timestamp (e.g., designated timestamp 126 of FIG. 1), and/or metadata to the third-party service 204. At 216, the third-party service 204 may send the received song identifier, timestamp, RTT, and/or metadata to the song player 208 (e.g., media application 104 of FIG. 1). At 218, the song player 208 may request pre-analyzed MSs, FSs, and/or modifications, e.g., corresponding to songs in a playlist (e.g., playlist 106 of FIG. 1) from the cloud database 210 and may proceed to step 220.

At block 220, the process 200 may determine whether to proceed to step 222 or steps 224-234 based on whether pre-analyzed data (e.g., MSs, FSs, and/or modifications) was available. If pre-analyzed data was available, at step 222, the cloud database 210 may return the MSs, FSs, and/or modifications (e.g., optimal modifications) to the song player 208 and the process may proceed to step 236. If pre-analyzed data was not available, at step 224, the song player 208 may request song data for analysis from song streaming service 206 and, at step 226, the song streaming service 206 may send the requested song data to song player 208. At step 228, the song player 208 may analyze the song for modifiability (e.g., a MS). At step 230, the song player 208 may generate one or more versions of the song with varying lengths (e.g., multiple modifications for a duration change). At step 232, the song player 208 may calculate the FS for each version (e.g., modification). At step 234, the song player 208 may store the MS, FSs, and/or modifications (e.g., optimal modifications) in cloud database 210, and the process may proceed to step 236.

At step 236, the song player 208 may select or create a playlist matching the RTT (e.g., and/or the identified future time 124 or 144 of FIG. 1). At step 238, the song player 208 may arrange the playlist based on identified MSs and the RTT (e.g., and/or the identified future time 124 or 144 of FIG. 1). At step 240, the song player 208 may retrieve pre-modified or unmodified song versions from song streaming service 206, and, at step 242, the song streaming service 206 may send the selected song versions to the song player 208. At step 244, the song player 208 may adjust the order of the playlist and modify songs as needed. At step 246, the song player 208 may monitor the RTT (e.g., and/or the identified future time 124 or 144 of FIG. 1), ETA, and RPT (e.g., and/or the estimated playback time). At step 248, the song player 208 may reorder the playlist based on the MSs to match the RTT and RPT (e.g., and/or the identified future time and the estimated playback time).

At block 250, the process 200 may determine to proceed to step 252 or steps 254-256 based on determining whether the reordering (e.g., at step 248) reduces the RTT-RPT discrepancy (e.g., or identified future time and estimated playback time discrepancy) below a threshold. If the reordering reduces the discrepancy below a threshold, at step 252, the song player 208 may continue playing the reordered playlist and may proceed to step 258. If the reordering does not reduce the discrepancy below a threshold (e.g., the discrepancy reduction is not sufficient), at step 254, the song player 208 may modify individual songs based on FSs and/or MSs, and at step 256, the song player 208 may adjust the playlist order to match POI arrival before proceeding to step 258.

At step 258, the song player 208 may retrieve modified song versions as needed from song streaming service 206. At step 260, the song streaming service 206 may send the requested modified song versions to the song player 208. At step 262, the song player 208 may finalize the playlist to synchronize with POI arrival.

In some embodiments, the content synchronization system may identify a designated timestamp within the time-sensitive content item to synchronize with an identified future time, e.g., corresponding to arrival at a POI. For example, the content synchronization system determines how much time t into the song the designated timestamp occurs. Further, for example, the content synchronization system determines a new time window based on subtracting the time t from the RTT (e.g., RTT-t). The content synchronization system may use the time window RTT-t to determine a duration that needs to be filled with content items to synchronize playback of the designated timestamp with the identified future time. Based on the determined duration, the content synchronization system may identify a playlist that fits within the time window RTT-t. In some examples, the content synchronization system generates and/or selects a playlist of unmodified songs whose total playtime matches RTT-t. In another example, the content synchronization is unable to generate and/or select a playlist of unmodified songs whose total playtime matches RTT-t and selects a set of songs based on the set of songs having the highest total MS with a total playtime that most closely matches RTT-t. In this example, the content synchronization modifies the selected songs such that the total duration exactly matches RTT-t, e.g., based on the MSs and the optimal modifications corresponding to the highest FSs.

In some embodiments, the content synchronization system prioritizes reordering content items within a playlist over modifications to individual content items until content item modification becomes necessary for synchronization, e.g., due to the higher computational cost of content item modification. In some embodiments, the content synchronization selects the best-fitting pre-modified versions of content items that have already been analyzed and scored (e.g., for FS and MS) and only makes additional modifications to the pre-modified content item versions when necessary, e.g., to decrease computational cost of the synchronization task.

Figure 3:
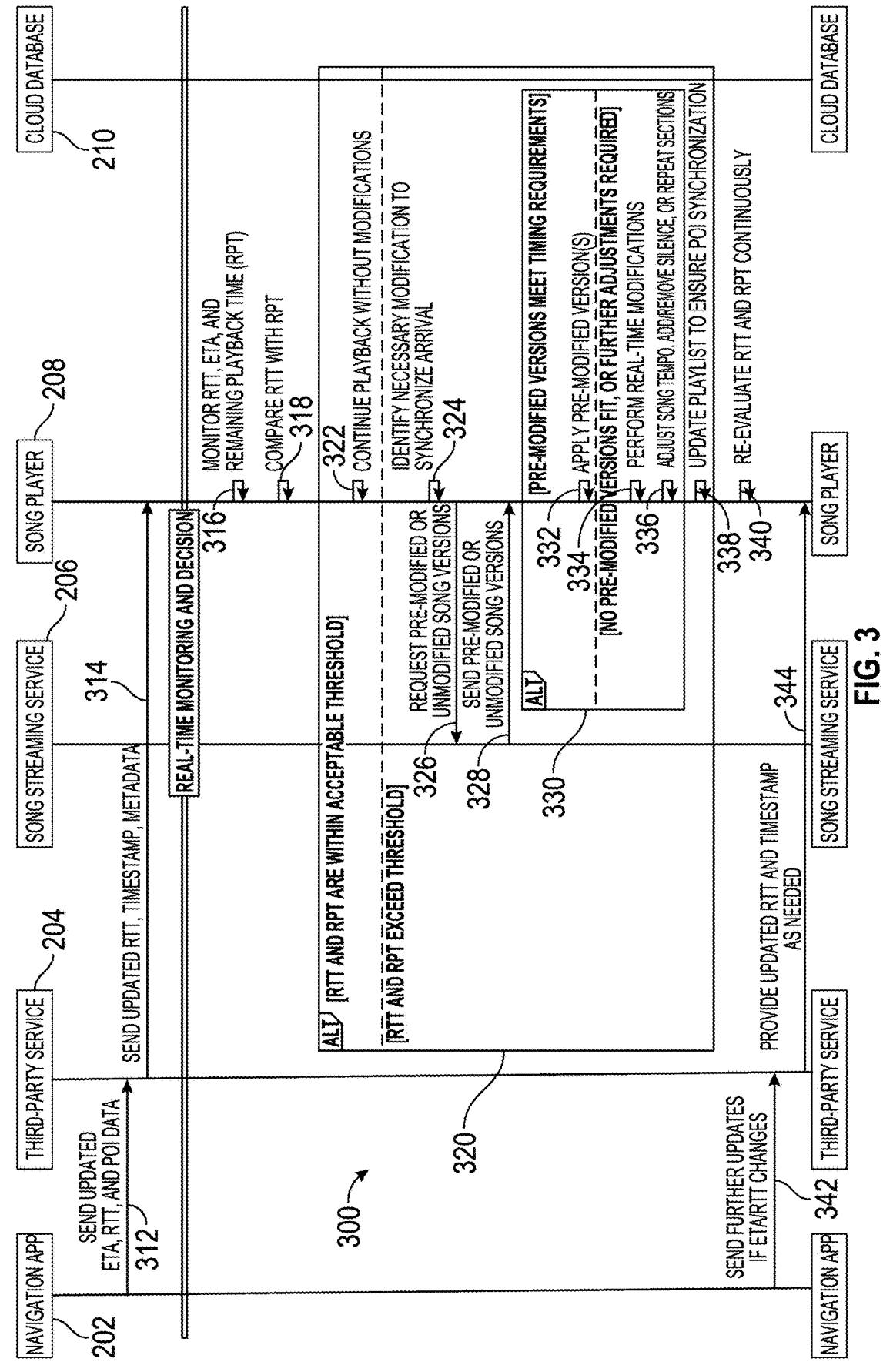
FIG. 3 is a flow diagram of an example process for dynamically modifying a playlist of songs to synchronize playback of a song with arrival at a POI, in accordance with some embodiments of the present disclosure.

FIG. 3 shows an example process 300 for dynamically modifying a playlist of songs to synchronize playback of a song with arrival at a POI, in accordance with some embodiments of the present disclosure. As shown in FIG. 3, in some embodiments, the content synchronization system (e.g., including navigation app 202, third-party service 204, song streaming service 206, song player 208, and/or cloud database 210) continually monitors the ETA and/or RTT to dynamically adjust the playlist as needed. For example, if the ETA changes, the content synchronization system recalculates RTT-t and makes any necessary adjustments to the playlist, e.g., reordering and/or modifying individual songs.

At step 312, the navigation app 202 may send an updated ETA (e.g., and/or identified future time 124 or 144 of FIG. 1), RTT, and/or POI data (e.g., of destination 118 of FIG. 1) to third-party service 204. At step 314, the third-party service 204 may send the updated RTT, timestamp, and/or metadata to song player 208.

In some embodiments, the process 300 includes real-time monitoring and decision-making consistent with steps 316-344. At step 316, the song player 208 may monitor RTT, ETA, and/or RPT. At step 318, the song player 208 may compare the RTT with RPT.

At block 320, the process 300 may determine to proceed to step 322 or steps 324-338 based on whether the RPT and RTT are within an acceptable threshold. If the RPT and RTT are determined to be within the acceptable threshold, at 322, the song player 322 may continue playback without modifications and may proceed to step 342. If the RPT and RTT are not determined to be within the acceptable threshold, at step 324, the song player 208 may identify necessary modification(s) to synchronize arrival. At step 326, the song player 208 may request pre-modified and/or unmodified song versions from song streaming service 206. At step 328, the song streaming service 206 may send the requested pre-modified and/or unmodified song versions to the song player 208. At block 330, the process 300 may determine to proceed to step 332 or steps 334-336 based on determining whether the pre-modified versions (e.g., received in step 328) meet timing requirements. If the pre-modified versions meet timing requirements, at step 332, the song player 208 may apply the pre-modified versions, e.g., by inserting them into the playlist, and may proceed to step 338. If no pre-modified versions were received, no pre-modified versions meet timing requirements, and/or further adjustment to the pre-modified versions are required, at step 334, the song player 208 may perform real-time modifications. At step 336, the song player 208 may adjust song tempo, add or remove silence, and/or repeat sections of the song and may additionally proceed to step 338. At step 338, the song player 208 may update the playlist to ensure POI synchronization and may proceed to step 340.

At step 340, the song player 208 may re-evaluate the RTT and RPT continuously, e.g., based on received updated RTT and/or timestamps. At step 342, the navigation app 202 may send further updates corresponding to changes in ETA and/or RTT to the third-party service 204. At step 344, the third-party service 204 may provide an updated RTT and/or timestamp as needed to the song player 208 and the process 300 may return to step 316.

Figure 4:
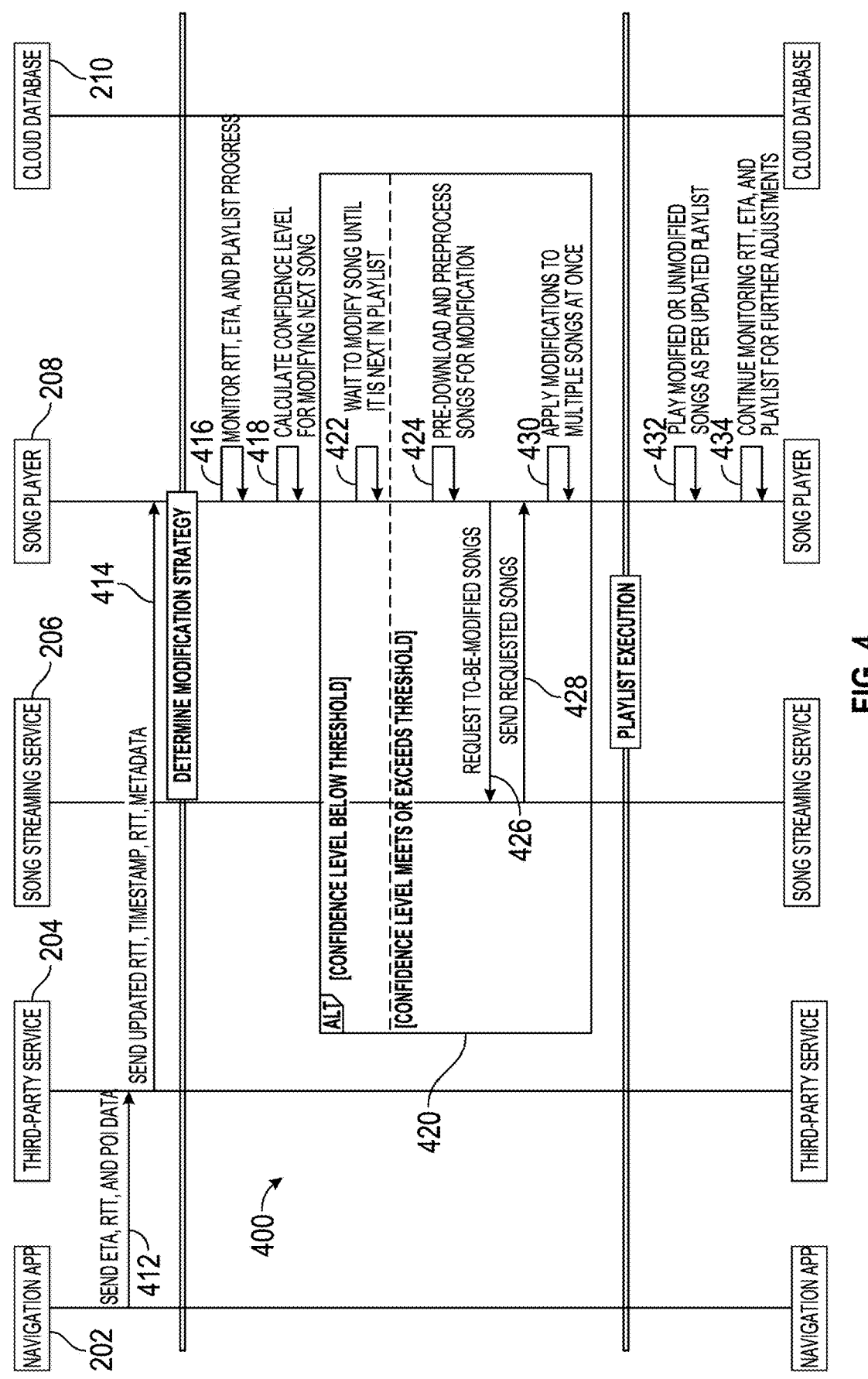
FIG. 4 is a flow diagram of an example process for dynamically modifying a playlist of songs to synchronize playback of a song with arrival at a POI, in accordance with some embodiments of the present disclosure.

FIG. 4 shows an example process 400 for dynamically modifying a playlist of songs to synchronize playback of a song with arrival at a POI, in accordance with some embodiments of the present disclosure. As shown in FIG. 4, in some embodiments, the content synchronization system (e.g., including navigation app 202, third-party service 204, song streaming service 206, song player 208, and/or cloud database 210) determines a modification strategy in accordance with steps 416-430 and executes the playlist in accordance with steps 432-434.

At step 412, the navigation app 202 may send an ETA (e.g., and/or identified future time 124 or 144 of FIG. 1), a RTT, and/or POI data (e.g., of destination 118 of FIG. 1) to third-party service 204. At step 414, the third-party service 204 may send a song identifier, the RTT, a timestamp, and/or metadata to song player 208. At step 416, the song player 208 may monitor RTT, ETA, and/or playlist progress. At step 418, the song player 208 may calculate a confidence level for modifying the next song, e.g., of the playlist.

At block 420, the process 400 may proceed to step 422 or steps 424-430 based on determining whether the confidence level (e.g., calculated in step 418) is above, at, or below a threshold. If the confidence level is below the threshold, at step 422, the song player 208 may wait to modify the song until it is next in the playlist (e.g., next in the queue of the playlist) and may proceed to step 432. If the confidence level is above or at the threshold, at step 424, the song player 208 may pre-download and preprocess the songs for modification. At step 426, the song player 208 may request songs for modification from the song streaming service 206 and, at step 428, the song streaming service 206 may send the requested songs to the song player 208. At step 430, the song player 208 may apply modifications to multiple songs at once and may proceed to step 432.

At step 432, the song player 208 may play modified and/or unmodified songs as per the updated playlist. At step 434, the song player 208 may continue monitoring RTT, ETA, and the playlist for further adjustments. For example, the process 400 at step 434 may return to step 416.

Figure 5A:
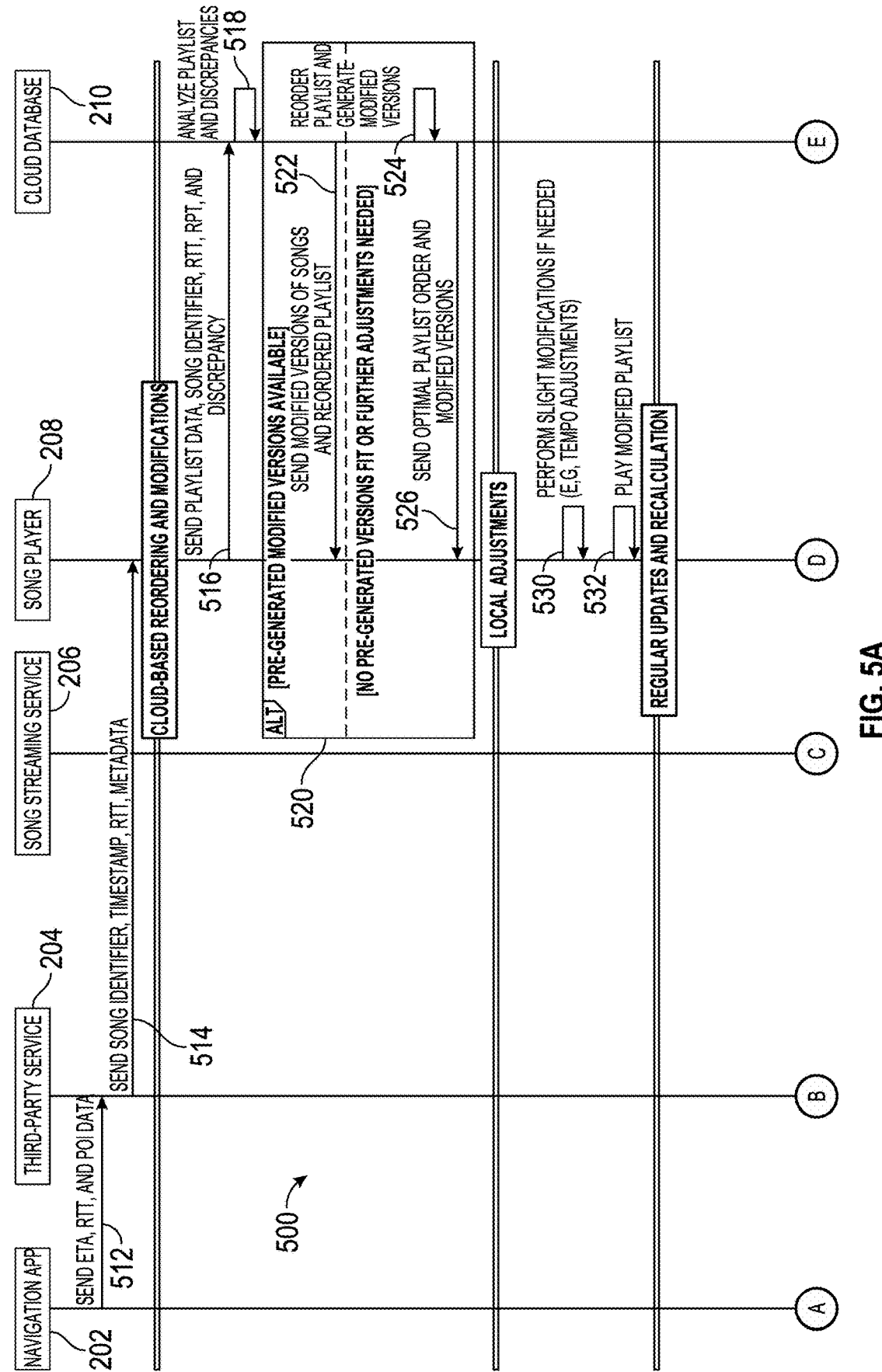
FIGS. 5A-5B are a flow diagram of an example process for dynamically modifying a playlist of songs to synchronize playback of a song with arrival at a POI, in accordance with some embodiments of the present disclosure.
Figure 5B:
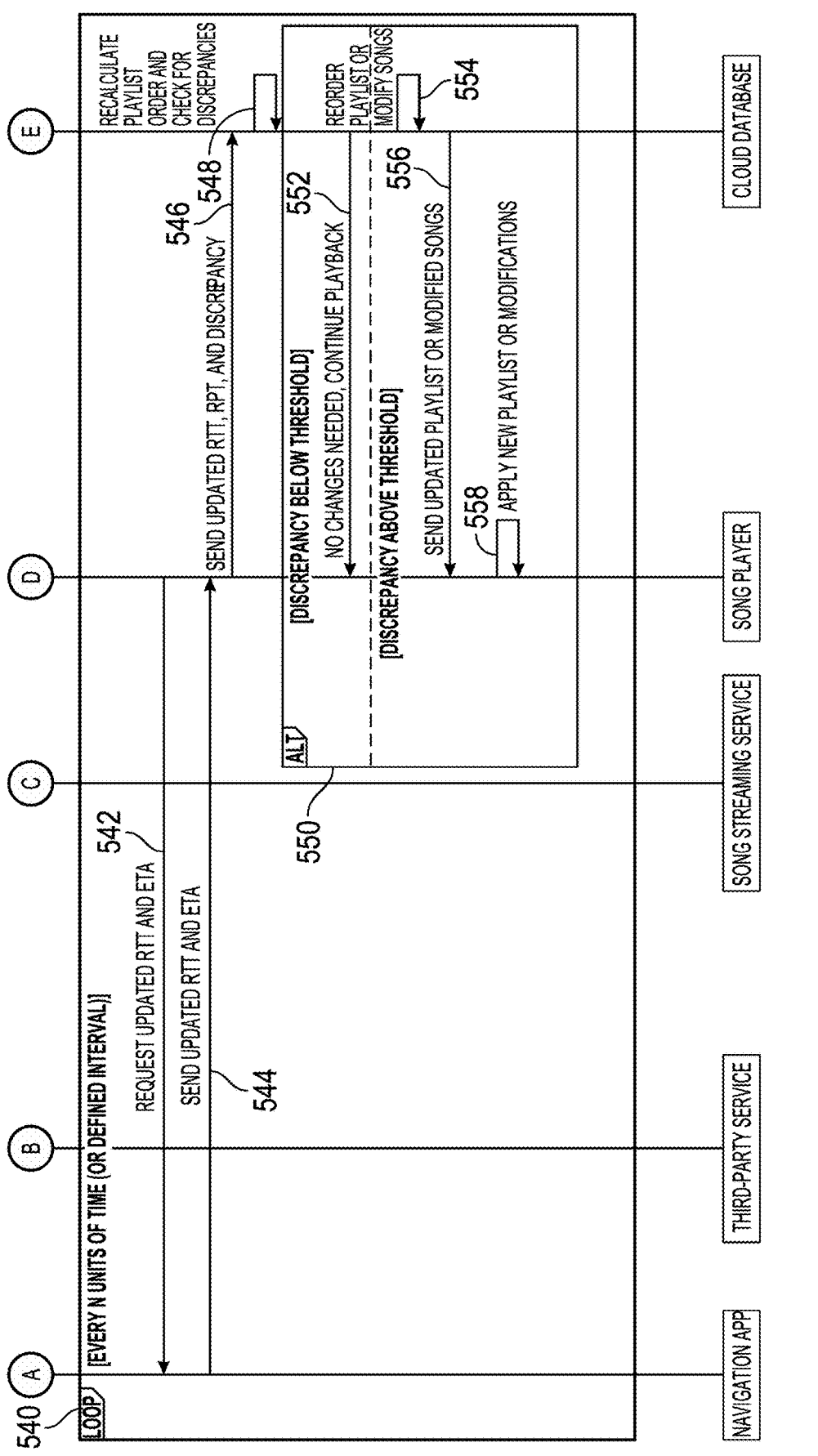

FIGS. 5A-5B are a flow diagram of an example process 500 for dynamically modifying a playlist of songs to synchronize playback of a song with arrival at a POI, in accordance with some embodiments of the present disclosure. As shown in FIG. 5, in some embodiments, the content synchronization system (e.g., including navigation app 202, third-party service 204, song streaming service 206, song player 208, and/or cloud database 210) performs cloud-based reordering and modifications in accordance with steps 516-526, performs local adjustments in accordance with steps 530-532, and regularly updates and recalculates the playlist in accordance with steps 540-558.

At step 512, the navigation app 202 may send an ETA (e.g., and/or identified future time 124 or 144 of FIG. 1), a RTT, and/or POI data (e.g., of destination 118 of FIG. 1) to third party service 204. At step 514, the third-party service 204 may send a song identifier, the RTT, a timestamp, and/or metadata to song player 208.

At step 516, the song player 208 may send playlist data, song identifier data, RTT (e.g., and/or identified future time), RPT (e.g., and/or estimated playback time), and/or the discrepancy (e.g., between the RTT and RPT, between the identified future time and the estimated playback time) to cloud service 210. At step 518, the cloud service 210 may analyze the playlist and the discrepancy.

At block 520, the process 500 may proceed to step 522 or step 524-526 based on whether pre-generated modified versions of songs are available. If pre-generated modified versions of songs are available, at step 522, the cloud service 210 may send the pre-generated modified versions of songs and a reordered playlist to song player 208 and may proceed to step 530. If pre-generated modified versions of songs are not available, at step 524, the cloud service may reorder the playlist and generate the modified versions of songs. At step 526, the cloud service 210 may send the optimal playlist order and the modified versions of songs to the song player 208 and may proceed to step 530. At step 530, the song player 208 may perform slight modifications as needed (e.g., adjustments to the tempo) and, at step 532, the song player 208 may play the modified playlist.

At block 540, the process 500 may enter a loop during which steps 542-558 are repeated every N units of time or other defined interval (e.g., every five minutes). At step 542, the song player 208 may request an updated RTT (e.g., and/or identified future time) and/or ETA from the navigation app 202. At step 544, the navigation app 202 may send the updated RTT and/or ETA to the song player 208. At step

646, the song player 2008 may send the updated RTT, RPT, and/or discrepancy (e.g., between the RPT and RTT) to the cloud service 210. At step 548, the cloud service may recalculate the playlist order and check for the updated difference (e.g., between the RPT and RTT). At block 550, the process 500 may proceed to step 552 or steps 554-558 based on determining whether the updated discrepancy (e.g., between the RPT and RTT) are above or below a threshold. If the updated discrepancy is below a threshold, at step 552, the cloud service 210 may indicate to the song player 208 that no changes are needed and playback should continue and may also proceed back to step 642 upon the next iteration of loop 540. If the updated discrepancy is above the threshold, at step 554, the cloud service 210 may reorder the playlist and/or modify songs of the playlist. At step 556, the cloud service 210 may send the updated playlist and/or modified songs to the song player 208. At step 558, the song player 208 may apply the new playlist (e.g., with the received modified songs) and may return to step 542 upon the next iteration of loop 540.

In some embodiments, the content synchronization system uses sensor data to detect when a user's head is pointed towards a particular location (e.g., a POI) before allowing playback of the time-sensitive content item to reach the designated timestamp. For example, cameras within a vehicle may perform skeletal reconstruction methods to determine the orientation of a user's head. Further, for example, the skeletal reconstruction methods include capturing sensor data and identifying the position and rotation of body landmarks (e.g., left shoulder, right elbow, or the like). Moreover, for example, the content synchronization system may retrieve vehicle orientation information from a navigation service and/or vehicle circuitries. In some embodiments, the content synchronization system may detect a field-of-view cone for the user based on the user's head orientation relative to the vehicle and the orientation of the vehicle. Additionally, for example, the content synchronization may receive navigation data to detect whether the field-of-view cone provides an unobstructed view of the POI (e.g., based on obstacles in the environment). In some embodiments, the content synchronization system modifies the time-sensitive content item to delay the designated timestamp until the user has an unobstructed field-of-view of the POI. In some examples, the content synchronization system repeats a first chorus of the time-sensitive content item (e.g., a song) based on determining that the user is not looking at the POI. In another example, the content synchronization system determines to remove a chorus based on detecting that the user is turning their head towards the POI.

Figure 7:
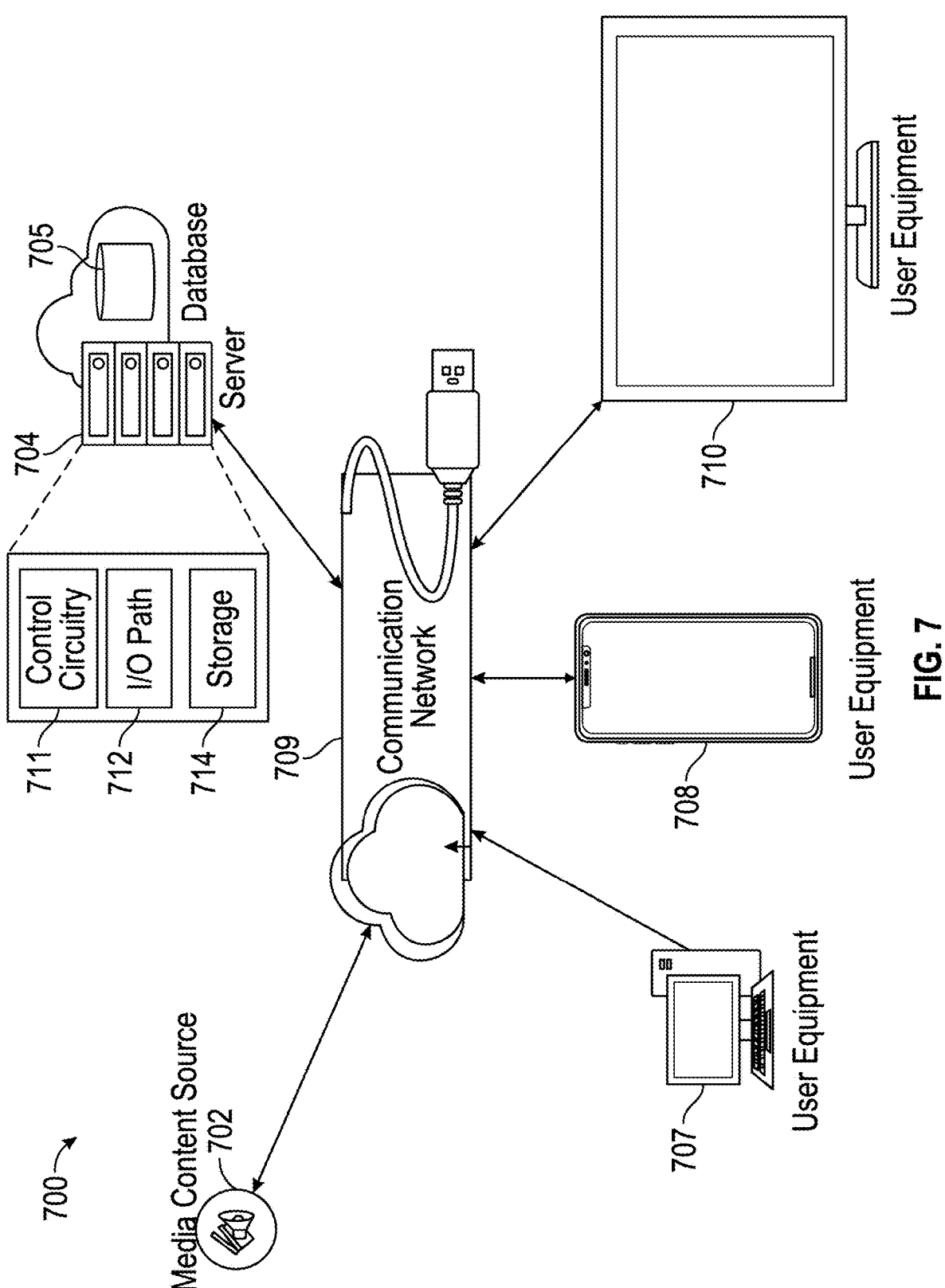

In some embodiments, the identified future time is not based on an estimated arrival time at a POI and is instead received by the content synchronization system as a user input (e.g., at user equipment 102 of FIG. 1 and/or user equipment 707, 708, or 710 of FIG. 7). For example, a user input may indicate a future time at which an event may be occurring in the user's physical surroundings (e.g., a sporting event, parade, and/or arrival of an acquaintance) for synchronization of a time-sensitive content item. Further, for example, the user input may additionally indicate the time-sensitive content item.

FIGS. 6-7 describe exemplary devices, systems, servers, and related hardware for dynamically modifying playlists of content items to coordinate content item playback time, in accordance with some embodiments of the present disclosure. FIGS. 6-7 may implement the content synchronization system (e.g., content synchronization system 100 of FIG. 1) described herein. FIG. 6 shows generalized embodiments of illustrative user equipment devices 600 and 601. For example, user equipment device 600 may be a smartphone device. In another example, user equipment system 601 may be a user television equipment system (e.g., user equipment 106 of FIG. 1). User television equipment system 601 may include set-top box 616. Set-top box 616 may be communicatively connected to microphone 618, speaker 614, and display 612. In some embodiments, microphone 618 may receive voice commands for the media application (e.g., of content synchronization system 100 of FIG. 1). In some embodiments, display 612 may be a television display or a computer display. In some embodiments, set-top box 616 may be communicatively connected to user input interface 610. In some embodiments, user input interface 610 may be a remote control device. Set-top box 616 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 6. Each one of user equipment device 600 and user equipment system 601 may receive content and data via input/output ("I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a content synchronization system stored in memory (e.g., storage 608). Specifically, control circuitry 604 may be instructed by the content synchronization system to perform the functions discussed above and below. In some implementations, any action performed by control circuitry 604 may be based on instructions received from the content synchronization system.

In client/server-based embodiments, control circuitry 604 may include communications circuitry suitable for communicating with a media server or other networks or servers. The instructions for carrying out the above mentioned functionality may be stored on a server (which is described in more detail in connection with FIG. 6. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as content synchronization system (e.g., media application) data described above. Nonvolatile memory may also be used (e.g., to launch a boot-up routine and other instructions). Cloud-based storage, described in relation to FIG. 6, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and down converting content into the preferred output format of user equipment 600. Circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment system 601. For example, display 612 may be a touchscreen or touch-sensitive display. In such circumstances, user input interface 610 may be integrated with or combined with display 612. Display 612 may be one or more of a monitor, a television, a display for a mobile device, or any other type of display. A video card or graphics card may generate the output to display 612. The video card may be any processing circuitry described above in relation to control circuitry 604. The video card may be integrated with the control circuitry 604. Speakers 614 may be provided as integrated with other elements of each one of user equipment device 600 and user equipment system 601 or may be stand-alone units. The audio component of videos and other content displayed on display 612 may be played through the speakers 614. In some embodiments, the audio may be distributed to a receiver, which processes and outputs the audio via speakers 614.

The content synchronization system may be implemented using any suitable architecture. For example, it may be a stand-alone application wholly-implemented on each one of user equipment device 600 and user equipment system 601. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to rearrange the segments as discussed. Based on the processed instructions, control circuitry 604 may determine what action to perform when input is received from user input interface 610. For example, movement of a cursor on a display up/down may be indicated by the processed instructions when user input interface 610 indicates that an up/down button was selected.

In some embodiments, the content synchronization system includes a client/server-based media application. Data for use by a thick or thin client implemented on each one of user equipment device 600 and user equipment system 601 is retrieved on-demand by issuing requests to a server remote to each one of user equipment device 600 and user equipment system 601. In some examples of a client/server-based guidance media application, control circuitry 604 runs a web browser that interprets web pages provided by a remote server. For example, the remote server may store the instructions for the media application in a storage device. The remote server may process the stored instructions using circuitry (e.g., control circuitry 604) to perform the operations discussed in connection with FIGS. 1 and 3-14.

In some embodiments, the media application (e.g., of the content synchronization system) may be downloaded and interpreted or otherwise run by an interpreter or virtual machine (run by control circuitry 604). In some embodiments, the media application may be encoded in the ETV Binary Interchange Format (EBIF), received by the control circuitry 604 as part of a suitable feed, and interpreted by a user agent running on control circuitry 604. For example, the media application may be an EBIF application. In some embodiments, the media application may be defined by a series of JAVA-based files that are received and run by a local virtual machine or other suitable middleware executed by control circuitry 604. In some of such embodiments (e.g., those employing MPEG-2 or other digital media encoding schemes), the media application may be, for example, encoded and transmitted in an MPEG-2 object carousel with the MPEG audio and video packets of a program.

FIG. 7 is a diagram of an illustrative streaming system, in accordance with some embodiments of the disclosure. User equipment devices 707, 708, 710 (e.g., user equipment device 102 of FIG. 1) may be coupled to communication network 706. Communication network 706 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706.

System 700 includes a media content source 702 and a server 704, which may comprise or be associated with database 705. Communications with media content source 702 and server 704 may be exchanged over one or more communications paths but are shown as a single path in FIG. 7 to avoid overcomplicating the drawing. In addition, there may be more than one of each of media content source 702 and server 704, but only one of each is shown in FIG. 7 to avoid overcomplicating the drawing. If desired, media content source 702 and server 704 may be integrated as one source device.

In some embodiments, server 704 may include control circuitry 711 and a storage 714 (e.g., RAM, ROM, Hard Disk, Removable Disk, etc.). Server 704 may also include an input/output path 712. I/O path 712 may provide device information, or other data, over a local area network (LAN) or wide area network (WAN), and/or other content and data to the control circuitry 711, which includes processing circuitry, and storage 714. The control circuitry 711 may be used to send and receive commands, requests, and other suitable data using I/O path 712, which may comprise I/O circuitry. I/O path 712 may connect control circuitry 704 (and specifically processing circuitry) to one or more communications paths.

Control circuitry 711 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 711 executes instructions for an emulation system application stored in memory (e.g., the storage 714). Memory may be an electronic storage device provided as storage 714 that is part of control circuitry 711.

Server 704 may retrieve guidance data from media content source 702, process the data as will be described in detail below, and forward the data to \ user equipment devices 707 and 710. Media content source 702 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 702 may be the originator of content (e.g., a television broadcaster, a Webcast provider, etc.) or may not be the originator of content (e.g., an on-demand content provider, an Internet provider of content of broadcast programs for downloading, etc.). Media content source 702 may include cable sources, satellite providers, on-demand providers, Internet providers, over-the-top content providers, or other providers of content. Media content source 702 may also include a remote media server used to store different types of content (including video content selected by a user), in a location remote from any of the client devices. Media content source 702 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 704), which may be located centrally or at distributed locations, that provide cloud-based services to various types of users and devices connected via a network such as the Internet via communication network 706. In such embodiments, user equipment devices may operate in a peer-to-peer manner without communicating with a central server.

Figure 8:
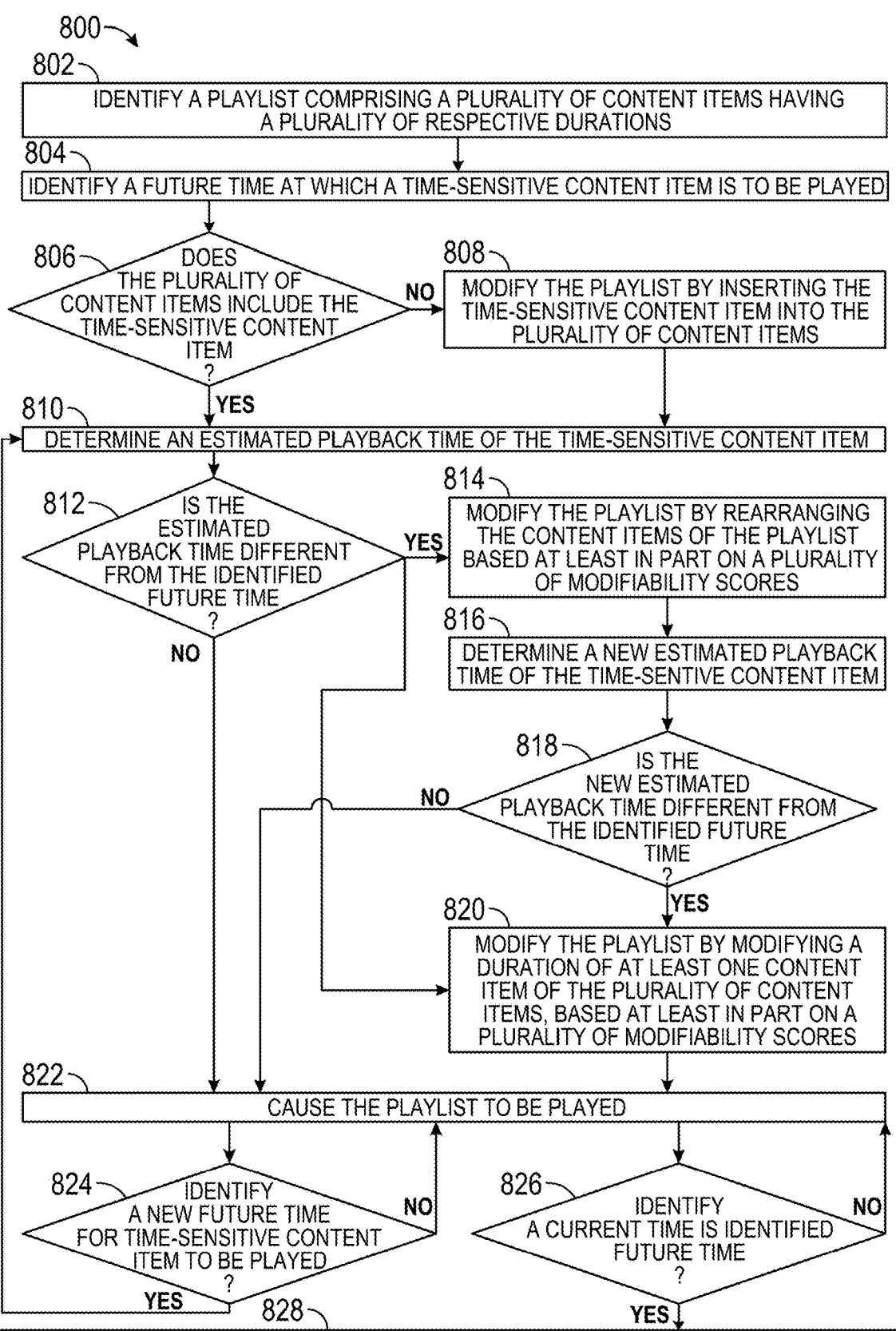
FIG. 8 is a flowchart of a process for dynamically modifying a playlist to synchronize content playback, in accordance with some embodiments of this disclosure.

FIG. 8 is a flowchart of a process for dynamically modifying a playlist of content items to synchronize content item playback with a future event, in accordance with some embodiments of this disclosure. In various embodiments, the individual steps of process 800 may be implemented by one or more components of the devices, methods, and systems of FIGS. 1-7 and 9 and may be performed in combination with any of the other processes and aspects described herein. Although the present disclosure may describe certain steps of process 800 (and of other processes described herein) as being implemented by certain components of the devices, methods, and systems of FIGS. 1-7 and 9, this is for purposes of illustration only, and it should be understood that other components of the devices, methods, and systems of FIGS. 1-7 and 9 may implement those steps instead.

At step 802, control circuitry (e.g., control circuitry 604 of computing device 600 of FIG. 1 and/or control circuitry 711 of server 704 of FIG. 7) is configured to identify a playlist (e.g., playlist 106 of FIG. 1) comprising a plurality of content items (e.g., songs, podcasts, audiobooks, video assets, combinations of the same, social media posts, or any other suitable content item, or any suitable combination thereof) having a plurality of respective durations. In some embodiments, text or other content of a social media post or other still image may be read aloud as part of the playlist, or otherwise displayed for a duration of time as part of the playlist.

At step 804, the control circuitry is configured to identify a future time (e.g., future time 124 of FIG. 1A-C) at which a time-sensitive content item (e.g., time-sensitive content item 120 of FIG. 1A-C) is to be played. In some embodiments, the future time corresponds to an estimated time of arrival at a POI (e.g., destination 118 of FIG. 1A-C) along a navigation route. In some embodiments, the time-sensitive content item is associated with the POI (e.g., a theme song associated with a theme park, specified by an entity associated with the theme park or specified by a user traveling to the POI). In some embodiments, the future time and/or time-sensitive content item is indicated by a user input (e.g., to user equipment 102 of FIG. 1A-C).

At decision block 806, the control circuitry is configured to determine if the plurality of content items (e.g., of the playlist 106 of FIG. 1A-C) include the time-sensitive content item. The control circuitry may be configured to proceed to step 808 if the time-sensitive content item is determined to not be within the plurality of content items. The control circuitry may be configured to proceed to step 810 if the time-sensitive content item is determined to be within the plurality of content items.

At step 808, the control circuitry is configured to modify the playlist by inserting the time-sensitive content item into the plurality of content items. For example, the control circuitry may attempt to insert the time-sensitive content item such that the estimated playback time best approximates the identified future time. The control circuitry is configured to proceed to step 810 upon successful insertion of the time-sensitive content item into the playlist. In some embodiments, at 808, the time-sensitive content item may be inserted into the playlist at a position corresponding to the identified future time, determined at 804.

At step 810, the control circuitry is configured to determine an estimated playback time of the time-sensitive content item. In some embodiments, the estimated playback time is determined based on a designated timestamp (e.g., designated timestamp 126 of FIG. 1A-C) within the time-sensitive content item. In some embodiments, the estimated playback time is determined based on the durations of content items in the plurality of content items of the playlist (e.g., positioned before the time-sensitive content item).

At decision block 812, the control circuitry is configured to determine if the estimated playback time is different from the identified future time. In some embodiments, the content synchronization system determines that an estimated playback time is different from the identified future time based on the difference between the estimated playback time and the identified future time exceeding a threshold. If the estimated playback time is determined to be different from the identified future time, the process 800 may proceed to step 814 or step 820 for modification of the playlist (e.g., by reordering and/or modification of content items of the playlist). In some embodiments, the process 800 proceeds to step 814 based on receiving a user indication that rearranging of the content items in the playlist is permitted and/or a determination that rearranging the content items positions the time-sensitive content item (e.g., or designated timestamp) closer to the identified future time. In some embodiments, the process 800 proceeds to step 820 based on receiving a user indication that rearranging of the content items in the playlist is not permitted and/or a determination that rearranging the content items does not position the time-sensitive content item (e.g., or designated timestamp) closer to the identified future time. If the estimated playback time is not determined to be different from the identified future time, the process 800 may proceed to step 822. In some embodiments, the process 800 proceeds to step 822 based on a current time being within a threshold time of the estimated playback time or the identified future time.

At step 814, the control circuitry is configured to modify the playlist by rearranging the content items of the playlist based at least in part on a plurality of modifiability scores. In some embodiments, the control circuitry modifies the playlist by rearranging the content items of the playlist such that content items with higher modifiability scores are positioned later in the playlist (e.g., closer to the position of the time-sensitive content item). In some embodiments, the control circuitry modifies the playlist by rearranging the content items of the playlist such that content items with higher modifiability scores are evenly distributed through the playlist.

At step 816, the control circuitry is configured to determine a new estimated playback time of the time-sensitive content item, e.g., based on the modifications to the playlist. In some embodiments, the new estimated playback time is determined based on a designated timestamp within the time-sensitive content item. In some embodiments, the new estimated playback time is determined based on durations of one or more modified content items in the plurality of content items of the playlist (e.g., positioned before the time-sensitive content item).

At decision block 818, the control circuitry is configured to determine whether the new estimated playback time is different from the identified future time. In some embodiments, the control circuitry determines that the new estimated playback time is different from the identified future time based on the difference between the new estimated playback time and the identified future time exceeding a threshold. If the new estimated playback time is determined to be different from the identified future time, the process 800 may proceed to step 820. If the estimated playback time is not determined to be different from the identified future time, the process 800 may proceed to step 822. In some embodiments, the process 800 proceeds to step 822 based on a current time being within a threshold time of the estimated playback time or the identified future time.

At step 820, the control circuitry is configured to modify the playlist by modifying a duration of at least one content item of the plurality of content items based at least in part on the plurality of modifiability scores (e.g., modified song B 140 of FIGS. 1B-1C). In some embodiments, the modifications include at least one of repeating or removing components of the content item, adjusting the tempo and/or playback speed; adding or removing silence to/from the audio track of the content item. In some embodiments, the modified content item is selected based on the set of modifiability scores, and a modification to the content item is selected based on the corresponding fidelity score of the modification.

At step 822, the control circuitry is configured to cause the playlist (e.g., modified playlist) to be played. In some embodiments, the causing the playlist to be played includes playing the time-sensitive content item and/or a timestamp within the time-sensitive content item at the identified future time.

At decision block 824, the control circuitry is configured to determine whether a new future time (e.g., new future time 144 of FIG. 1A-C) at which the time-sensitive content item is to be played (e.g., corresponding to a delay in arrival due to traffic along a navigation route) is identified. If a new future time is identified, the process 800, at step 824, may return to step 810 to identify a new estimated playback time of the time-sensitive content item (e.g., based on modifications from steps 814 and/or 820). If a new future time is not identified, the process 800 may return to step 822, where the control circuitry continues to cause the playlist to be played.

At decision block 826, the control circuitry is configured to identify whether a current time (e.g., current time 122 or 142 of FIG. 1A-C) is the identified future time (e.g., a new future time), e.g., within a (e.g., configured) threshold. If it is determined that the current time is the identified future time (e.g., or within the threshold of the identified future time), the process may proceed to step 828. If it is determined that the current time is not the identified future time (e.g., or within the threshold of the identified future time), the process may return to step 822.

At step 828, the control circuitry is configured to cause the time-sensitive content item to be played, e.g., at the identified future time (e.g., or within the threshold of the identified future time).

In certain representative embodiments, as shown in FIG. 9, control circuitry (e.g., control circuitry 604 of computing device 600 of FIG. 1 and/or control circuitry 711 of server 704 of FIG. 7), e.g., of a content synchronization system (e.g., content synchronization system 100 of FIG. 1), is configured to perform a process 900 to calculate a modifiability score for a content item.

At step 902, the control circuitry identifies a content item and a plurality of modifications corresponding to the content item, wherein each modification corresponds to a duration change (e.g., +/−3 dollars). At step 904, the control circuitry identifies a fidelity score for each modification of the plurality of modifications. In some embodiments, the fidelity score is a number between 0 and 1, where a score of 1 indicates the original quality of the content item is retained. The fidelity scores may be determined using at least one of the following: human-based analysis, computational modeling, and ML models, combinations of the same, or the like. At step 906, the content synchronization system determines a modifiability score for a content item based on a weighted average of the content items rated by a user. In some embodiments, the weights of the weighted average correspond to the lengths of the duration change. In some embodiments, the modifiability score is stored in a database (e.g., a local database and/or a cloud database).

What is claimed is:

1. A method comprising:
   identifying a playlist comprising a plurality of content items having a plurality of durations, respectively;
   identifying a future time at which a time-sensitive content item of the plurality of content items is to be played;
   identifying a plurality of modifiability scores for the plurality of content items;
   determining an estimated playback time of the time-sensitive content item, based at least in part on the plurality of durations;
   determining that the estimated playback time is different from the identified future time;
   modifying the playlist by modifying a duration of at least one content item of the plurality of content items to synchronize the estimated playback time of the time-sensitive content item with the identified future time, based at least in part on the plurality of modifiability scores and a difference between the estimated playback time and the identified future time; and causing the modified playlist to be played, including causing the time-sensitive content item to be played at a time such that the time-sensitive content item is playing when the future time becomes a present time.

2. The method of claim 1, wherein identifying the future time at which the time-sensitive content item of the plurality of content items is to be played further comprises:

retrieving the time-sensitive content item, wherein the plurality of content items does not comprise the time-sensitive content item; and modifying the playlist by inserting the time-sensitive content item into the plurality of content items.

3. The method of claim 1, wherein the identified future time is associated with a designated timestamp within the time-sensitive content item, wherein the determining the estimated playback time is further based at least in part on the designated timestamp, and wherein the causing the modified playlist to be played includes causing the designated timestamp to be played at the future time.

4. The method of claim 1, wherein the modifying the playlist further comprises:

selecting, based on the plurality of modifiability scores, a content item of the plurality of content items;

identifying a plurality of fidelity scores corresponding to a plurality of modifications to the selected content item;

selecting, based on the plurality of fidelity scores, a modification of the plurality of modifications to the selected content item; and modifying the selected content item based on the selected modification.

5. The method of claim 4, wherein the selected content item is the time-sensitive content item.

6. The method of claim 4, wherein the selected content item is a song, and the selected modification comprises at least one of:

repeating or removing a component of the song, wherein the component comprises at least one of an instrumental break, a chorus, or a verse of the song;

adjusting a tempo of the song; or adding or removing silence at a location within the song, wherein the location corresponds to at least one of the verse, the chorus, between a verse and a chorus, between verses, or between choruses of the song.

7. The method of claim 1, wherein each modifiability score of the plurality of modifiability scores is determined by a method comprising:

identifying a plurality of modifications to a content item of the plurality of content items, wherein each modification corresponds to a duration change;

identifying a fidelity score for each modification of the plurality of modifications to the content item; and determining the modifiability score corresponding to the content item based on a weighted average of the identified fidelity scores, wherein each of the identified fidelity scores is weighted by the duration change corresponding to the modification.

8. The method of claim 1, wherein the modifying the playlist further comprises:

identifying an additional plurality of modifiability scores corresponding to an additional plurality of content items, wherein the plurality of content items does not comprise the additional plurality of content items;

selecting, based on the additional plurality of modifiability scores, a content item of the additional plurality of content items with a highest modifiability score; and inserting the selected content item into the plurality of content items.

9. The method of claim 1, wherein the modifying the playlist further comprises modifying an order of the plurality of content items such that content items corresponding to higher modifiability scores are arranged after content items corresponding to lower modifiability scores.

10. The method of claim 1, wherein the plurality of content items comprises at least one of:

a song;

a podcast;

an audiobook; or a video asset.

11. The method of claim 1, wherein the identified future time corresponds to an estimated time of arrival at a point of interest (POI) along a navigation route, and wherein the time-sensitive content item is associated with the POI or a preference received from a user.

12. The method of claim 11, wherein the future time is an updated future time, wherein the estimated time of arrival is an updated estimated time of arrival, and the method further comprises:

identifying an initial future time, based on the estimated time of arrival at the POA;

identifying the updated future time by updating the initial future time at which the time-sensitive content item of the plurality of content items is to be played, wherein the updated future time corresponds to the updated estimated time of arrival at the POI, which is updated based at least in part on detecting increased traffic along the navigation route.

13. The method of claim 11, wherein the future time is continually updated based on continually monitoring the estimated time of arrival until the continually updated future time becomes the present time.

14. The method of claim 1, wherein the future time is an updated future time, and wherein the estimated playback time is an updated estimated playback time, and wherein the method further comprises:

prior to identifying the updated future time, identifying an initial future time at which the time-sensitive content item of the plurality of content items is to be played;

determining an initial estimated playback time of the time-sensitive content item, based at least in part on the plurality of durations;

determining that the initial estimated playback time is different from the initial future time;

modifying the playlist by modifying a duration of at least one content item of the plurality of content items to synchronize the initial estimated playback time of the time-sensitive content item with the initial future time, based at least in part on the plurality of modifiability scores and a difference between the initial estimated playback time and the initial future time; and identifying the updated future time based at least in part on determining that the initial future time has changed.

15. The method of claim 1, wherein the modifying the playlist is based on determining that the difference between the estimated playback time and the identified future time exceeds a threshold time.

16. The method of claim 1, wherein the modifying the playlist is based on determining that the present time is within a threshold time of the identified future time or the estimated playback time.

17. A system comprising:

control circuitry configured to:

identify a playlist comprising a plurality of content items having a plurality of durations, respectively;

identify a future time at which a time-sensitive content item of the plurality of content items is to be played;

identify a plurality of modifiability scores for the plurality of content items;

determine an estimated playback time of the time-sensitive content item, based at least in part on the plurality of durations;

determine that the estimated playback time is different from the identified future time;

modify the playlist by modifying a duration of at least one content item of the plurality of content items to synchronize the estimated playback time of the time-sensitive content item with the identified future time, based at least in part on the plurality of modifiability scores and a difference between the estimated playback time and the identified future time; and cause the modified playlist to be played, including causing the time-sensitive content item to be played at a time such that the time-sensitive content item is playing when the future time becomes a present time.

18. The system of claim 17, wherein the control circuitry is configured to identify the future time at which the time-sensitive content item of the plurality of content items is to be played by:

retrieving the time-sensitive content item, wherein the plurality of content items does not comprise the time-sensitive content item; and modifying the playlist by inserting the time-sensitive content item into the plurality of content items.

19. The system of claim 17, wherein the identified future time is associated with a designated timestamp within the time-sensitive content item, wherein the control circuitry is configured to determine the estimated playback time based at least in part on the designated timestamp, and wherein the control circuitry is configured to cause the modified playlist to be played by causing the designated timestamp to be played at the future time.

20. The system of claim 17, wherein the control circuitry is configured to modify the playlist by:

selecting, based on the plurality of modifiability scores, a content item of the plurality of content items;

identifying a plurality of fidelity scores corresponding to a plurality of modifications to the selected content item;

selecting, based on the plurality of fidelity scores, a modification of the plurality of modifications to the selected content item; and modifying the selected content item based on the selected modification.

* * * * *